US006676733B2

(12) United States Patent
Ludwig et al.

(10) Patent No.: US 6,676,733 B2
(45) Date of Patent: Jan. 13, 2004

(54) PHYSIOLOGICALLY ACCEPTABLE AND NON-CORROSIVE SILICONE COMPOSITIONS, METHODS OF MAKING AND USING THEM TO RENDER SURFACES WATER AND SOIL REPELLENT

(75) Inventors: Jerome H. Ludwig, Sun City West, AZ (US); Howard G. Ohlhausen, Paradise Valley, AZ (US)

(73) Assignee: Resource Development L.L.C., Scottsdale, AZ (US)

( * ) Notice: Subject to any disclaimer, the term of this patent is extended or adjusted under 35 U.S.C. 154(b) by 315 days.

(21) Appl. No.: 09/941,896

(22) Filed: Aug. 28, 2001

(65) Prior Publication Data

US 2002/0026881 A1 Mar. 7, 2002

Related U.S. Application Data

(63) Continuation-in-part of application No. 09/518,033, filed on Mar. 3, 2000, now Pat. No. 6,432,181.

(51) Int. Cl.$^7$ .............................. C09K 3/18; C09G 1/18
(52) U.S. Cl. ................. 106/2; 106/3; 106/10; 106/213; 106/270; 106/271; 106/272; 106/287.1; 106/287.11; 106/287.12; 106/287.13; 106/287.14; 106/287.15; 106/287.16; 427/180; 514/974; 523/103; 516/123; 516/DIG. 1
(58) Field of Search .......................... 106/2, 3, 10, 213, 106/270, 271, 272, 287.1, 287.11, 287.12, 287.13, 287.14, 287.15, 287.16; 427/180; 514/974; 523/103; 516/123, DIG. 1

(56) References Cited

U.S. PATENT DOCUMENTS

| 2,512,458 A | 6/1950 | Fujisaki | 235/84 |
|---|---|---|---|
| 2,612,458 A | 9/1952 | Stedman | 117/92 |
| 2,923,653 A | 2/1960 | Matlin et al. | 154/101 |
| 2,962,390 A | 11/1960 | Fain et al. | 117/64 |
| 3,244,541 A | 4/1966 | Fain et al. | 106/13 |
| 3,579,540 A | 5/1971 | Ohlhausen | 260/33.4 |
| 3,817,769 A | 6/1974 | Fisher | 106/287 |
| 3,998,643 A | 12/1976 | Liddle | 106/2 |
| 4,343,857 A | 8/1982 | Uram, Jr. | 428/336 |
| 4,431,771 A | 2/1984 | Falender et al. | 524/863 |
| 4,615,738 A | 10/1986 | Sanders, Jr. et al. | 106/13 |
| 4,837,261 A | 6/1989 | Hampe et al. | 524/268 |
| 5,021,089 A | 6/1991 | Kuwata et al. | 106/2 |
| 5,417,744 A | 5/1995 | Gasmena | 106/2 |
| 5,584,917 A | 12/1996 | Kijima et al. | 106/2 |
| 5,697,991 A | 12/1997 | Frazer | 51/306 |
| 5,759,618 A | 6/1998 | Taylor | 427/140 |
| 5,854,342 A | 12/1998 | Kirochko et al. | 524/805 |
| 6,432,181 B1 * | 8/2002 | Ludwig | 106/2 |

FOREIGN PATENT DOCUMENTS

| DE | 196 49 479 | 6/1997 |
|---|---|---|
| DE | 198 09 057 | 10/1998 |
| EP | 0 166 396 | 1/1986 |
| EP | 0 591 955 | 4/1994 |
| EP | 0 914 302 | 10/1998 |
| EP | 0 914 303 | 10/1998 |

* cited by examiner

Primary Examiner—David Brunsman
(74) Attorney, Agent, or Firm—Wood, Herron & Evans, L.L.P.

(57) ABSTRACT

Physiologically acceptable and non-corrosive silicone compositions are used for treating surfaces such as glass, porcelain, ceramic, marble, granite, metal, coated metal, plastic, wood, painted wood, cement, leather, textile, cloth, and other hard or soft composite surfaces, to render them water and soil repellent. Volatile organic compound (VOC) free cream, paste, powder and solid compositions are provided by the inclusion of particulate stabilizers in the silicone compositions. Solventless silicone compositions provide numerous advantages with improved water and soil repellency qualities.

77 Claims, No Drawings

PHYSIOLOGICALLY ACCEPTABLE AND NON-CORROSIVE SILICONE COMPOSITIONS, METHODS OF MAKING AND USING THEM TO RENDER SURFACES WATER AND SOIL REPELLENT

RELATED APPLICATION

This application is a continuation-in-part application of patent application Ser. No. 09/518,033, filed on Mar. 3, 2000 now U.S. Pat. No. 6,432,181, which is incorporated herein in its entirety by reference.

FIELD OF THE INVENTION

This invention relates to physiologically acceptable and non-corrosive acidic silicone compositions and a method for treating surfaces such as glass, porcelain, ceramic, polished or painted metal, plastic, and the like, to render them water and soil repellent. Volatile organic compound (VOC) free cream, paste, powder and solid compositions are provided. These acidic silicone compositions are non-toxic, non-irritating, non-corrosive and free of volatile organic compounds. They also allow treated surfaces to be effectively cleaned with only plain water, mild soap or detergent solutions and without the need to use acidic, caustic or abrasive cleaners.

BACKGROUND OF THE INVENTION

There has been extensive research and development involving silicone compositions for rendering nonporous surfaces water repellant. U.S. Pat. No. 2,612,458 (Stedman) discloses the application of substituted polysilicanes to windshields to achieve repellency. U.S. Pat. No. 2,923,653 (Matlin) discloses improved compositions employing alkoxy groups in the polysilicane to improve the repellency. U.S. Pat. No. 2,962,390 (Fain, et al.) describes a paste containing a solid rubbing agent and an alkyl alkoxy silane which when rubbed on a glass surface provides repellency. U.S. Pat. No. 3,244,541 (Fain, et al.) discloses acidic solutions of alkyl alkoxy silane monomers that produce rain repellent films on glass and which are also solvent resistant.

U.S. Pat. No. 3,579,540 (Ohlhausen) discloses water repellent film-forming compositions of alkylpolysiloxanes and acid or alkylpolysiloxanes, acid and solvent which result in durable and effective water repellent films on nonporous substrates. This patent also discloses the importance of adding the acid to the alcohol to form the intermediate half ester and then to add the alkylpolysiloxane in order to solublize the alkylpolysiloxane and eliminate the formation of two or three phases in the mixture. It also discloses that the alkylpolysiloxanes can be employed with solvents, diluents and extenders including colloidal pyrogenic silicas and clays. Isopropyl alcohol solvent was preferred. U.S. Pat. No. 3,817,769 (Fisher) discloses a rapid curing repellent composition by use of dyes, i.e., methylene blue, to give a durable and tough polysiloxane film. However, films prepared in accordance with Fisher's examples gave poor repellency results unless sulfuric acid was also incorporated in the composition. U.S. Pat. No. 3,998,643 (Liddle), discloses the addition of hydrogen fluoride to the Ohlhausen compositions and processes with claimed improved repellency and durability.

U.S. Pat. No. 5,021,089 (Uwata, et al.), discloses a water repellent composition comprising a volatile organic solvent, a silyl phosphate and an organopolysiloxane, thus eliminating the mineral acid required in previously disclosed water repellent compositions. U.S. Pat. No. 5,417,744 (Gasmena) discloses a composition containing a fluorinated polysiloxane, a polysiloxane, a polyester modified polysiloxane, an acid, water and an alcohol to obtain an optically clear coating having hydrophobic properties. U.S. Pat. No. 5,584,917 (Kijima) discloses a water repellent composition comprising an amino group-containing polyorganosiloxane, an organic acid, a surfactant and an aqueous solvent. U.S. Pat. No. 5,697,991 (Frazer) discloses an alkypolysiloxane, mineral acid, solvent and a mild abrasive (0.5–3.0%, preferred 1%) as an improved water repellent treating compound wherein the abrasive serves to enhance dirt and grit removal. U.S. Pat. No. 5,759,618 (Taylor) discloses a strong phosphoric acid, hydrofluoric acid, sulfuric acid cleaning solution for glass surfaces prior to the application of an excess of an alkoxysilane/sulfuric acid solution to the glass surface with timing, temperature and humidity being critical for the removal of the excess in order to achieve an abrasive resistant, water repellent coating on the surface of the glass.

U.S. Pat. No. 4,005,030 (Heckert, et al.) discloses a detergent composition containing an anionic detergent and an organosilane capable of imparting soil release benefits to hard surfaces washed with the detergent solution. However, repeated washing will subsequently remove the coating. U.S. Pat. Nos. 5,900,459 and 6,107,399 (Selley, et al.) describe an aqueous silicone emulsion for improving the release and antideposition character of a hard impermeable surface such as automobile front ends so that the treated surfaces are easier to clean and do not require as much scouring, scraping or soaking to clean. U.S. Pat. No. 6,074,470 (Fisher, et al.) describes stable aqueous emulsions of alkoxysilanes which render porous inorganic substrates such as masonry, cement, stone, insulation products or wood water repellent by brush coating, roller coating, spraying or mixing with uncured concrete. Although silicone emulsions can penetrate and cure within porous substances, they generally require extended time for evaporation of the water phase to adhere strongly to the surface, are not long lasting and exhibit poor resistance to incidental or intentional contact with soaps, solvents, detergents and other chemicals.

After almost three decades of research and development in water repellent silicone coatings, the dominant technology has involved the use of acidified solvent-based silicone compositions. A multitude of commercial products have been formulated and marketed utilizing some form of alkylsiloxane at about a 10% concentration and a mineral acid at about a 1% concentration and an alcoholic solvent. These alcoholic solutions all yield water repellent coatings on nonporous surfaces, particularly glass surfaces, by application directly onto the surface, usually by rubbing with a paper towel or cloth. Upon evaporation of the alcohol, a hazy film remains which is further polished with a dry wipe material to achieve the desired transparent water repellent coating. During the application process, the odor of the evaporating alcohol can be objectionable, particularly in the confined quarters of a shower or bathroom. OSHA recommends human exposure limits for most alcohols and other solvents to minimize health concerns, i.e., isopropanol (OSHA PEL:TWA 400 ppm, STEL 500 ppm) and ethanol (OSHA PEL:TWA 1000 ppm). These volatile solvents also contribute to air pollution and are considered to be undesirable volatile organic compounds (VOCs) by regulating authorities. These solvents have storage and handling limitations because they are also flammable and could ignite during application or form explosive mixtures if the vapors are confined.

Solvent-based silicone compositions currently have limited industrial and consumer applications due to their flammability and the toxic vapor exposure to the workers. These solvent-based silicones require additional capital expenditures for explosion proof application equipment, exhaust equipment for vapor removal and scrubbing, and the monitoring of user exposure to the solvent vapors.

The application of solvent-based silicone compositions utilizes excessive amounts of silicone per square foot of coverage provided due to the evaporation of the solvent and absorption of the silicone by the wipe material. Excessive amounts of the silicone remains in the wipe material and cannot be applied to the surface to be treated. The presence of solvents can also be incompatible with gaskets, paint, etc., associated with the surface being treated. Thus, a need exists for a water repellent composition that eliminates solvents and utilizes the silicone more effectively and economically.

The application of solvent-based silicone compositions also requires time for evaporation of the solvent and results in a hazy water repellent coating which is attributable to the separation of the acid, usually sulfuric acid, from the silicone on evaporation of the solvent. The resulting haze requires removal by a second polishing step or washing and drying of the surface in order to achieve an optically clear coating. Thus, it is desirable to provide a composition that produces an optically clear water and soil repellent coating without excessive waiting, manpower or additional cleaning.

The haze which develops upon application of a solvent based system to a nonporous surface and evaporation of the compatibilizing solvent results from the development of a silicone phase and a strong acid phase. This haze must then be wiped and/or polished in order to intimately mix the silicone and acid phases onto the surface to remove the excess of the two phases and render it optically clear, and water and soil repellent.

Solvent-based silicone compositions also have storage temperature limitations. For example, ethanolic compositions in closed containers cannot be stored at temperatures above 120° F. and have been reported to "explode" due to the high storage temperatures that can sometimes occur in warehouses or during transport in closed trucks and the like which results in an increase in the internal vapor pressure in the container leading to rupture. Not only does this cause a loss of product and packaging material but it presents a potential hazardous flammable and/or explosive event. There further exists a need for a water repellent silicone composition which is free of volatile organic compounds (VOCs), or VOC compliant, and which is nonhazardous.

Most solvent-based silicone compositions contain the active silicone ingredients at about a 10%/wt level. Thus, almost 90% of the composition is solvent and this requires a large container in order to deliver the product to the customer. The larger container in turn requires more packaging material, larger boxes, more warehouse space, higher shipping costs and more shelf space. It would be very desirable to provide a concentrated silicone composition which has associated with it reduced manufacturing, packaging, storage, transportation and related sales costs, and which provides significantly fewer ounces used per square foot of coverage on the surface to the treated.

When dilute solvent-based silicone compositions are applied to a hard surface and wiped to a polished water repellent coating, the silicone coating is very thin, on the order of a mono molecular layer. These thin coatings will not hide the fine scratches and other defects in the hard surface that has been coated. It would also be desirable to provide a silicone coating composition which will leave an optically clear multimolecular layer which can hide or fill the fine scratches and other defects in the nonporous surface being coated and which results in a restored appearance to the surface.

In view of the above state of the art on research and development of water and soil repellent silicone compositions, a number of improvements are needed.

SUMMARY OF THE INVENTION

In the above-identified related patent application, essentially solventless water and soil repellent compositions for treating nonporous surfaces were disclosed. Cream, paste and powder forms of these compositions were also disclosed. These compositions consist essentially of a multi-phase dispersion of a silicone and an acid. A solid stabilizer is distributed in the multi-phase dispersion in an effective amount to stabilize the dispersion against separation. These new silicone compositions thereby overcome the many disadvantages presently associated with solvent-based silicone compositions as set forth in the background of this invention.

This invention is directed to further improvements in the compositions and methods disclosed in the above-identified related application. In particular, physiologically acceptable and non-corrosive compositions are intimate mixtures of silicone, acid and particulate solid in relative amounts to obtain the benefits of water and soil repellency. However, the acid is essentially sequestered in the composition to render it physiologically acceptable to epithelial tissue. The acidic composition is also rendered non-corrosive. The acid forms a chemical and/or physical complex with the silicone and particulate solid stabilizer components of the composition until the acid is activated by application of the composition to a surface to render it water and soil repellent. The physiologically acceptable and non-corrosive properties of the composition are satisfied by tests that prove the compositions to be non-irritating to eyes and skin, non-toxic by ingestion and non-corrosive. For example, the compositions of this invention are physiologically acceptable to epithelial tissue in accordance with the Code of Federal Regulations, 16 CFR 1500. Moreover, the compositions are also non-corrosive, for example, in that they do not exhibit a corrosion rate on steel or aluminum surfaces in accordance with the established hazardous material regulations and procedures referenced. An acceptable test for non-corrosiveness is described in 49 CFR §173.137(c)(2), ASTM G31-72 (reapproved in 1995). Another test described hereinafter as the "Acid Availability Test ("AAT")", is a measure of the readily available acid and correlates to the physiologically acceptable or non-corrosive properties of the compositions.

The water and soil repellent compositions of this invention are useful for treatment of a variety of nonporous and porous surfaces including glass, porcelain, ceramic, marble, granite, polished or painted (coated) metal, plastic, wood, leather, concrete, textile, and the like, to render them water and soil repellent. The existing needs in the consumer, commercial and industrial fields are fulfilled by compositions of this invention because they are also VOC free or VOC compliant, economical, non-flammable, non-combustible, practical, easy to apply, haze-free upon application, capable of homogeneous delivery of the active ingredients and offer improved water/soil repellency qualities.

In another embodiment, the water and soil repellent compositions of this invention are formulated and used in the physical form of a cream, paste or powder. In this embodiment, an additive may be used, as described hereinafter, to dilute the silicone and/or the acid phase of the composition. However, in any of these physical forms, the particulate solid stabilizer compatibilizes the components or phases against separation. These forms of the silicone compositions enable multi-molecular and transparent coatings to be formed on a variety of nonporous surfaces. Furthermore, these multi-layered coatings hide or fill fine scratches and other defects in the nonporous surface being coated. Thus, the compositions and methods of this invention enable the restoration of nonporous surfaces, such as glass, which develop fine scratches and other defects in use.

Methods of preparing physiologically acceptable and non-corrosive compositions are also provided by this invention. In the solventless compositions, silicone compounds and neat acid (without solvent) are mixed with a particulate solid stabilizer in an effective amount to compatibilize or couple the components in a homogeneous mixture. In some cases, it may be desirable to heat the mixture and/or employ high-shear mixing to achieve the desired intimate blending of the components to ensure stabilization. It has been found necessary to intimately mix the components in the composition to achieve physiological acceptability and non-corrosiveness as measured by any one or more of the tests described hereinafter by 16 CFR 1500, ASTM G3-72 and the Acid Availability Test. The necessary intimate mixing is provided by any one of a number of mixers or shearing devices. Examples of a number of mixers include homogenizers and/or rotator/stator/high shear mixers that achieve satisfactory homogenization to sequester the acid in the composition. Various forms of shear or homogenization can be achieved by different means including milling, high-pressure homogenization, ultrasonication, microfluidization, high-speed blenders, ball milling, attrition, cavitation, impaction, and the like.

The resulting composition of silicone liquid, acid and stabilizer, may be a cream, paste, powder or solid, depending upon the most desired form for the intended application. It has been found that a particulate solid stabilizer is most advantageously employed in the form of fine particles. The fine particles enable the intimate delivery of the silicone and acid in the proper proportion to the surface to be treated. The solid stabilizer is contained in an amount from about 5 to about 90 percent by weight of the composition depending on the product type desired, and preferably consists of particles having an average size of less than about 150 microns, more preferably about 1 to about 50 microns, and having a specific gravity on the order of about 0.12 to 2.9 gm/cc, more preferably for creams and pastes about 0.12 to about 1.8 gm/cc. A wide variety of silicones, acids and particulate solid stabilizers may be utilized in accordance with the principles of this invention as understood with respect to the following detailed description.

DETAILED DESCRIPTION OF THE INVENTION

In accordance with the above summary, the objectives of this invention are to provide methods for rendering nonporous and porous surfaces demonstrably water and soil repellent with physiologically acceptable and non-corrosive compositions of matter that (1) are non-flammable, non-combustible VOC free or VOC compliant and essentially solventless, (2) are more easily applied as a cream, paste or powder, (3) provide optically clear films upon application to a surface which may be multi-molecular in thickness to fill in microscopic surface scratches, (4) are storage stable, (5) provide improved coverage per weight or volume applied, and that (6) provide coatings which are more durable and more resistant to removal by soaps, solvents, detergents, strong acids and alkalis. These objectives are accomplished by stabilizing a multi-phase dispersion of a silicone and an acid against separation in the form of a stabilized cream, paste or powder by the use of a solid stabilizer distributed in the dispersion in an effective amount.

The terms as used in this description and claims are defined as follows:

The term "physiologically acceptable" means non-irritating to epithelial tissue such as eye and skin when tested in accordance with protocols that meet the Guidelines of Federal Hazardous Substances Act/Consumer Product Safely Commission, Code of Federal Regulations, 16 CFR 1500 or other accepted tests which demonstrate non-irritation to epithelial tissue.

The term "non-corrosive" means non-corrosive to metals (steel and aluminum) when tested in accordance with protocols that meet the Guidelines of 49 CFR 173.137(c)(2), ASTM G31-72 (re-approved 1995) or other accepted tests which demonstrate non-corrosiveness to metals or other substrates.

The term "solventless" means no solvent or essentially free of solvent to obtain benefits of this invention.

The term "VOC free" or variations thereof, means no volatile organic compound (VOC) or essentially free of VOCs to obtain benefits of this invention.

The term "surface(s)" means a variety of non-porous or porous surfaces, preferably non-porous surfaces exemplified by glass, porcelain, ceramic, marble, granite, polished or painted metal, plastic, polished or painted wood and porous surfaces exemplified by cementicous, leather, textile and other hard or soft composite surfaces.

The terms "durable", "durability" and "durability test" mean long-lasting and resistant to removal by incidental exposure to or wiping/washing with any soap, solvent, detergent, abrasive or chemical agent that would not otherwise damage, etch or blemish a similar untreated surface.

The term "marker test" means the measure of the degree of continuous-film staining and/or ease of removal of "permanent" type felt-tip markers as supplied by Dennison Stationary Products Co., Framingham, Mass. under their "Magic Marker" trademark.

The terms "intimate mixture", "intimate(ly) mixing", "intimately mixed" describe a degree, level or thoroughness of mixing or agitation of the components, using a variety of techniques, equipment and temperatures, sufficient to prevent separation and provide storage stability of the composition.

The terms "water and soil repellent composition", "water and soil repellent" and "water and soil repellency" mean a composition that, when applied to a surface, renders that surface repellent to water, soil and stains as measured, in the case of water, by contact angles that are at least two times that of contact angles on similar clean, untreated surfaces and, in the case of soil or stains, to be at least one-half the adhesion and build-up of soil and stains on clean, untreated surfaces exposed to the same soiling and staining agents.

The term "sequester(ed)(ing)" means that the acid forms a chemical and/or physical complex with the silicone and particulate solid stabilizer components of the composition until the acid is activated by application of the composition to a surface to render the surface water and soil repellent.

The term "Acid Availability Test (AAT)" means a procedure that measures the time required to neutralize 5% of the hydrogen ion present in an acidic composition. Using the procedure of the test, the shorter the time required for neutralization, the greater the amount and/or availability of the acid for neutralization and the longer the time required for neutralization, the more the acid is sequestered in the composition until the composition is applied to a surface.

The term "additive(s)" as used herein means chemicals, solvents and stabilizers added to the composition to improve ease of application, durability, water and soil repellency and other features of the composition.

In accordance with a best mode of this invention, improved water and soil repellent, nonflammable, noncombustible VOC free compositions for surfaces are prepared by mixing an organosilicone compound with an acid and an effective amount of a solid stabilizer in the absence of a volatile organic compound. The mixing is preferably conducted with homogenization so as to sequester the acid in the composition and to render it physiologically acceptable and non-corrosive.

A. Silicones

Generally, the silicones, silicone fluids or silicone liquids can be described by the formula (A):

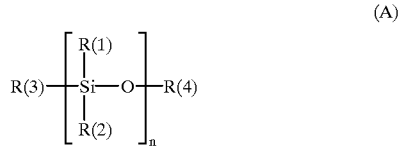

(A)

in which
n is an integer from 1 to about 1000,
R(1) and R(2) are independently lower alkyl, substituted alkyl, alkenyl, halogenated alkyl, alkoxy, or halogenated alkoxy radicals containing from 1 to 8 carbon atoms; aryl, halogenated aryl, phenoxy, alkylphenoxy, halogenated phenoxy or halogenated alkylphenoxy radicals containing about 6 to 14 carbon atoms; hydrogen, hydroxy, or halogen;
and combinations thereof, and
R(3) and R(4) are independently alkyl, substituted alkyl, alkenyl, halogenated alkyl, phenyl, alkylphenyl, substituted phenyl, hydroxyl, halogen, hydrogen or alkoxy, phenoxy, substituted alkoxy, substituted phenoxy, halogenated phenoxy, halogenated alkylphenoxy, and combinations thereof.

Suitable organosilicone compounds include silicone fluids such as polydialkylpolysiloxanes, polyalkylpolyalkoxypolysiloxanes, polyalkylhydrogensiloxanes, polyalkylarylpolysiloxanes, organofunctional polysiloxanes, fluorosubstituted alkylpolysiloxanes, cyclic siloxanes, and the like having terminal trialkylsiloxy, dialkylarylsiloxy, dialkylsilanol, and other organofunctional groups, and the like, and combinations thereof. Suitable cyclic siloxanes are hexamethylcyclotrisiloxane, octamethylcyclotetrasiloxane and decamethylcyclopentasiloxane. Copolymer fluids such as polyalkylhydrodimethylsiloxanes are also suitable. The fluids need not be linear but may also be branched. These silicone fluids of various molecular weights are commercially available as described and are listed in the literature of silicone fluid suppliers such as Wacker Silicones Corporation, Adrian, Mich.; Gelest, Inc., Tullytown, Pa.; Petrarch Systems, Bristol, Pa.; General Electric Co., Waterford, N.Y.; Osi Specialties, Inc. (Witco Corporation), Danbury, Conn.; Genesee Polymers Corp., Midland, Mich.; Dow Coming Corp., Midland, Mich.; Allied Signal, Inc., Performance Chemicals Div., Morristown, N.J.; PCR, Inc., Gainsville, Fla.; Rhodia Silicones, Lyon, France; Shin-Etsu Silicones of America, Inc., Akron, Ohio; etc.

The relative amounts of components will vary to achieve the objectives of this invention and, in general, the amounts, in percent by weight, are about 10 to about 85 silicone, about 0.5 to about 20 acid and about 5 to about 40 solid stabilizer. As set forth in the examples which follow for creams, the ranges (percent by weight) are about 53–83 silicone, about 2.5–15.3 acid and about 5.5–40 solid stabilizer. Pastes and semi-solids range (percent by weight) from about 33.6–80.5 silicone, about 2–12.5 acid and about 9–62.8 solid stabilizer. For powders, the silicone may be reduced, for example, to lower amounts of about 20 percent by weight with a higher amount of stabilizer, i.e., about 75 percent by weight and about 2–3 percent by weight of acid. However, the following examples illustrate and do not limit the scope of the invention.

B. Acids

Suitable acids which are encompassed by the present invention are both mineral acids and their acidic salts along with strong organic acids. Included are sulfuric acid, sulfurous acid, hydrofluoric acid, hydrochloric acid, hydrobromic acid, phosphoric acid, phosphorous acid, pyrophosphoric acid, nitric acid, hydrogen sulfide, iodic acid, periodic acid, chromic acid, sulfamic acid, fluorosilicic acid, chlorosulfonic acid, fluorosulfonic acid, ammonium bifluoride, sodium bisulfate, mono- di- and trichloroacetic acid, mono- di- and trifluoroacetic acid, p-toluene sulfonic acid, benzene sulfonic acid, ethylsulfonic acid, methylsulfonic acid, ethylenedisulfonic acid, dodecylsulfonic acid, trifluoromethylsulfonic acid, perfluoroalkylcarboxylic acids, oleum, perfluoroalkylsulfonic acids, alcohol sulfates, ethyl sulfate, maleic acid, picric acid, trihydroxybenzoic acid, trinitrophenol and mixtures thereof.

In certain selected applications the acid component of the composition may be generated in situ by employing acid generating substances such as chlorosilanes, phosphorous trichloride, phosphorous tribromide, aluminum chloride, sulfonylchloride, acid chlorides, and the like, in the compositions of this invention. These materials react with the water which is adsorbed on the surface to be treated. This reaction generates (in situ) the strong acid required for the proper bonding of the silicone to the surface treated.

C. Solid Stabilizers

Particulate solid stabilizers that have been found suitable for use in combination with the silicones and acids of the water and soil repellent compositions of this invention include mica, hydrocarbon waxes, polyethylene, polypropylene, polytetrafluoroethylene, phenolic resins, polyvinylchloride, crystalline graphite, amorphous graphite, carbon black, silicas, boron nitride, carnauba wax, glass microspheres, ceramic microspheres, perlite, vermiculite, talc and combinations thereof. It is desirable to have the solid stabilizers in a finely divided state to achieve the intimate delivery of the silicone and the acid in the proper proportion to the surface and to achieve the desired form of the composition for a particular end use application.

Particularly suitable solid stabilizers are those with average particle sizes less than 150 microns, preferably in the 1–50 micron range, and having a specific gravity of about 0.12 to about 2.9 gm/cc, more preferably for creams and pastes about 0.12 to about 1.8 gm/cc in order to achieve good shelf life. The finer the particle size the less critical the specific gravity becomes.

Solid stabilizers must not be basic or reactive with acids. Such solids as powdered metals, metal oxides, metal carbonates, metal hydroxides, metallic soaps such as zinc stearate, amines, polyamino resins, and the like, would react with the acids in the compositions of this invention and deteriorate or prevent the bonding of the silicones to the surface to be treated.

On occasion, when making a cream, paste, powder or solid, it is desirable to admix the compositions of this invention with liquid or solid additives, including water, glycols, and the like, in order to achieve the desired performance of the composition, i.e., in order to achieve the desired coating thickness of the water and soil resistant coating on certain surfaces. In these cases, the additives will impact the silicone and/or the acid phases of the multi-phase dispersion, but the solid stabilizer will still be effective in the composition. However, in order to achieve the advantages of a VOC free or solventless form of the compositions of this invention, solvents are essentially excluded. For example, in order to maintain the desirable features of being "VOC-free", the additives must meet Part 59 of the National Volatile Organic Compound Emission Standards for Consumer and Commercial Products; Section 59203 Standards for Consumer Products, Subpart (f) requirements:

(1) Has a vapor pressure of less than 0.1 millimeters of mercury at 20 degrees Celsius; or (2) Consists of more than 12 carbon atoms, if the vapor pressure is unknown; or (3) Has a melting point higher than 20 degrees Celsius and does not sublime (i.e., does not change directly from a solid into a gas without melting), if the vapor pressure is unknown.

or, they must have been excluded from the definition of "Volatile Organic Compound" such as various halogenated organic compounds; certain classes of perfluorocarbons; cyclic, branched, or linear completely methylated siloxanes; waxes; or low-reactive organic compounds that have been exempted by the United States Environmental Protection Agency.

Additionally, for use in the compositions of this invention, these additives cannot interact with the silicone fluids, acids or the solid stabilizers employed in the compositions of this invention or with the effective application of the compositions to the surface to be treated. Examples of additives which meet all the criterion would be perchloroethylene, parachlorobenzotrifluoride (Oxsol 100, supplied by Occidental Chemical Corporation), decamethylcyclopentasiloxane, diethyleneglycol dibutylether (vapor pressure less than 0.01 mm Hg at 20 degrees Celsius), linear alkylbenzene sulfonate, glycerylmonostearate, stearic acid, hydrocarbon waxes, and the like.

Ancillary additives such as fragrances or colorants may also be added to the compositions of this invention to enhance the features of the compositions for various markets.

The principles of this invention and its parameters will be further understood with reference to the following detailed examples, procedures and discussion which serve to illustrate the types of materials and processes which can be utilized in practicing this invention. These examples and procedures are considered to be exemplary of this invention, and should not be considered as limiting in view of the broad disclosure of the principles of this invention.

EXAMPLES AND PROCEDURES

A. Testing Procedures

1. Application of Water and Soil Repellent Silicone Compositions to Surfaces

Glass mirrors (12"×12") were employed in the general testing program and are cleaned with an abrasive cleanser, i.e., "Miracle Scrub", an excellent, multi-surface, hard surface abrasive cleaner supplied by Unelko Corporation of Scottsdale, Ariz., to remove all surface residues including prior water and soil repellent compositions. The cleanser is removed from the cleaned surface by flushing with water. If the surface is properly cleaned, the rinse water will form a continuous smooth film of water across the cleaned surface of the glass. The mirrors are then placed in a vertical position to drain and then dried with paper towels. The cleaned mirror surface is then allowed to equilibrate with the atmosphere for 24 hours prior to the application and evaluation of the water and soil repellent compositions.

Other surfaces such as porcelain, ceramic tiles, chrome, stainless steel, plastics, leather, formica, cloth, and the like, may also be employed in the evaluation of water and soil repellent compositions.

Application of the water and soil repellent compositions to a horizontal, cleaned mirror surface may be accomplished in various ways. With the current alcoholic solvent based compositions, it is generally recommended by the suppliers to apply an excess of the liquid to the surface to be treated and then spread the liquid over the surface with an applicator such as a paper towel or cloth in order to cover the entire surface with the solution. The solvent is then allowed to evaporate which results in a hazy surface. The haze is then polished until the surface is clear with a dry wiping material such as a cloth or paper towel.

With the compositions of this invention it has been found that only a small amount of the composition need be applied to the mirror surface or to the applicator since the effective coverage has been found to be about 1000 sq feet per ounce of material, i.e., 30 milligrams/sq foot. Current solvent based water and soil repellent compositions suppliers claim to coverages of about 3000 sq ft per gallon of material or 24 sq ft per ounce.

Applicators that have been found to be adequate for the compositions of this invention include paper towels, cloths, sponges, foamed plastics, microfiber clothes and pads and the like. Acid resistant applicators are preferred for repeated applications of the acidic compositions. Small amounts of the compositions are wiped onto the mirror surface until clear, and a smooth homogeneous coating is achieved. This is basically a one step process as there is no residual haze which has to be removed in a second wiping on washing and drying of the surface as occurs with the application of solvent based compositions. The coated mirror surfaces are then ready for testing of repellency and durability.

2. Evaluation of Coating for Water Repellency and Durability a. Water Drop Test: Several drops of water are applied in a line across the mirror surface with the surface in a horizontal position. The contact angle of the drops are observed and the repellency ranked as:

Excellent: Compact, well rounded, bright sparkle with excellent contact angle (95+ degrees)

Good: Somewhat less rounded with slight spread, bright with good contact angle (85–95 degrees)

Fair: Slight flattening with some spread and only fair contact angle (70–85 degrees)

Poor: Flat with spread and poor contact angle (70 degrees or less)

b. Water Drop Mobility Test: The mirror is then slowly raised on the end that parallels the line of the drops placed on the treated surface. The angle of the mirror or the height of the raised edge of the mirror from the flat supporting surface at which time the drops begin to flow down the inclined mirror is observed. The smaller the angle or the less the height of the edge, the better the repellency and contact angle.

The following ranking is employed:

Excellent: 0 to 10 degree incline(0" to 2" raised edge height)

Good: 10 to 20 degree incline (2" to 3½" raised edge height)

Fair: 20 to 30 degree incline (3½" to 5" raised edge height)

Poor: Greater than 30 degree incline (greater than 5" raised edge height)

c. Water Spray and Blow Test: A spray bottle fitted with an adjustable sprayer set to deliver a spray or fine stream of water is employed in this test. The coated mirror is again placed in a horizontal position and 4 to 5 pumps of water spray/stream are delivered to the surface of the mirror test specimen with the sprayer or water stream in a slightly raised position from horizontal. The spray droplets are then observed over the area sprayed. The droplets are varied in size and are ranked in the same matter as the Water Drop Test above with the additional observation as to the abundance of the smaller drop sizes.

Excellent: Drops are compact, well rounded, bright sparkle with excellent contact angle and a large number of fine drops in the spray pattern Good: Drops are somewhat less rounded with slight spread, bright with good contact angle and a fair number of fine drops in the spray pattern Fair: Drops have slight flattening with some spread and only fair contact angle and small number of fine drops in the pattern Poor: Drops are flat with spread and poor contact angle After the spray pattern of drops are evaluated the blow test is conducted. The ease with which the drops will flow in the direction of the air blow and the degree of blow hardness is noted:

Excellent: Light force blow and easy flow of drops

Good: Moderate force blow and fairly easy flow of drops

Fair: Increased force blow and slow flow of drops

Poor: Forceful blow and very slow flow of drops d. Marker Repellency and Detergent Durability Test No. 1

A paper towel dipped in a strong basic detergent solution, i.e., a 50% aqueous solution of "Easy Green", a heavy-duty grease and soil cleaner composition supplied by Unelko Corporation, Scottsdale, Ariz., is rubbed vigorously on half of the coated surface of the mirror. The excess detergent is removed from the surface with a water rinse and hand wash to assure that all the detergent has been removed. The mirror is then dried with a paper towel.

To determine the degree of residual repellency, a black "Magic Marker", i.e., as supplied by Dennison Stationary Products Co., Framingham, Mass., is stroked across the unwashed coated surface and then across the washed coated surface and the streak observed. On an "Excellent" water repellent and soil repellent coating the marker will leave only a trail of fine droplets and a discontinuous line which is hardly visible. For a "Good" evaluation the discontinuous line will have slightly larger drops but no solid streaks. For a "Fair" evaluation the drops will again be larger but the line may have light solid sections or streaks of solid black. And, for a "Poor" evaluation the line will be essentially solid black with perhaps a few large drop areas.

The marker trail can be easily removed by wiping with a paper towel when an "Excellent" result is observed for the fine droplet line. Removal of the line becomes more difficult as the Detergent Durability Test result goes to "Good" to "Fair" to "Poor" at which point the line is very difficult to remove by rubbing with a paper towel. Most coatings based on this technology have both "Excellent" Detergent Durability and "Excellent" Marker Repellency ratings for both the washed and unwashed treated surfaces.

Test No. 2

A paper towel dipped in a strong basic detergent solution, i.e., a 50% aqueous solution of "Easy Green", a heavy-duty grease and soil cleaner composition supplied by Unelko Corporation, Scottsdale, Ariz., is rubbed vigorously on about 20% (2"×12") of the coated surface of the test mirror. A wet paper towel is rubbed on a bar of Ivory soap and the soapy paper towel rubbed vigorously on another 20% section of the coated surface of the test mirror. The excess detergent and soap are is removed from the surface with a water rinse and hand wash to assure that all the detergent and soap have been removed. The mirror is then dried with a paper towel.

A paper towel is then dipped into anhydrous ethanol, a polar solvent, and rubbed vigorously on another 20% section of the test mirror and then wiped dry with a paper towel. Another paper towel is dipped into mineral spirits, a non-polar solvent, and rubbed vigorously on another 20% section of the test mirror and then wiped dry with a paper towel.

To determine the degree of marker repellency and coating durability a black "Magic Marker", i.e., as supplied by Dennison Stationary Products Co., Framingham, Mass., is stroked across the unwashed coated surface and then across the 4 sections of the test mirror (detergent washed, soap washed, ethanol washed and mineral spirits washed) and the residual line observed. On an "Excellent" water and soil repellent coating the marker will leave only a trail of fine droplets and a discontinuous line which is hardly visible. For a "Good" evaluation the discontinuous line will have slightly larger drops but no solid streaks. For a "Fair" evaluation the drops will be still larger but the line may have light solid sections or streaks of solid black. For a "Poor" evaluation the line will be essentially solid black with perhaps a few large drop areas.

The marker trail can be easily removed by wiping with a paper towel when an "Excellent" result is observed for the fine droplet line. Removal of the line becomes more difficult as the Detergent Durability Test result goes from "Excellent" to "Good" to "Fair" to "Poor" at which point the line is very difficult to remove by rubbing with a paper towel. Most coatings based on this technology have an "Excellent" Durability Test result on all treated and washed sections of the test mirror.

It has also been observed that the mirror coatings resulting from the application of the compositions of this invention generally result in a mirror surface that is brighter in appearance and one that also appears to have been restored as noted by the disappearance of minor scratches from the surface of the glass. It is believed that this is due to a thicker multimolecular coating being deposited on the glass surface by the compositions of this invention. Thin monomolecular coatings are thought to be deposited from solvent systems which do not result in restorative features to the glass surface.

3. Acid Availability Test (AAT)

The Acid Availability Test is designed to determine the relative availability of the hydrogen ion present in the microparticulate silicone surface care compositions of this invention and is also believed to be an indication of the degree of the eye irritation, skin irritation, acute oral toxicity and metal corrosivity of the compositions. Accordingly, this "Acid Availability Test" as used herein, and in the claims, is meant to provide another test for inventive products which are "non-corrosive" and "physiologically acceptable" to epithelial tissue when tested in accordance with the tests under 16 CFR 1500 and ASTM G31-72 reported hereinafter.

The amount of acidic silicone composition employed in the test is determined by the amount of acid in the composition. All samples tested employed the same acid content, namely 0.03 moles of hydrogen ion. The time that is required to neutralize 5% of the hydrogen ion present in the sample (0.0015 moles) under test conditions was determined.

For example: If a composition contains 10% sulfuric acid, a 15 gram sample was tested (which contained 1.5 gms sulfuric acid or 0.015 moles of sulfuric acid or 0.030 moles of hydrogen ion), and the time to neutralize 5% of the hydrogen ion present (0.0015 moles) by reaction with 1.50 mls of 1 N sodium hydroxide solution (0.0015 moles of sodium hydroxide) was determined by a color change in the indicator used.

The test procedure was as follows. The proper amount of the acidic silicone composition was weighed into a glass 250 ml beaker containing a 2½" teflon coated magnetic stirring bar. 100 ml of mineral spirits was then added to the beaker to fluidize the sample by stirring on a magnetic stirrer (Corning Stirrer Hot Plate, Model PC 420) for about 2 minutes. An indicator/neutralizing solution was prepared by addition of 1.50 ml of 1.00 N sodium hydroxide solution (using a micro syringe) to 50 ml of distilled water containing 0.5 ml of a 1% phenolphthalein solution in 95% ethanol. Then, with the magnetic stirrer set at a speed of 6, the indicator/neutralizing solution was added to the mineral spirit/composition mixture and the time of addition noted. Stirring was continued at a constant speed until the color of the indicator changes. The time to color change was then recorded.

The Acid Availability Test result is a measure of the time required for the indicator color to change completely. The longer the time, the greater the sequestering of the acid, the lower the irritation, toxicity and corrosivity of the composition. As shown hereinafter, this measure of "acid availability" can be correlated with products which are non-corrosive and physiologically acceptable products under 16 CFR 1500 and ASTM G31-72.

EXAMPLES

Example 1

Phase Performance Test

To demonstrate the necessity for the intimate mixing of the silicone with the acid to achieve the desired performance in water and soil repellent compositions, the solvent was evaporated from 100 gms "Invisible Shield" ("Invisible Shield" is an anhydrous ethanolic solution of a dimethylsiloxane polymer reaction product with sulfuric acid, a commercially available water and soil repellent for shower doors, ceramic tile, etc., marketed by the Unelko Corporation, Scottsdale, Ariz.) by gently heating in a beaker on a hot plate with magnetic stirring and an air stream to assist in the solvent evaporation. As the solvent was removed the solution became cloudy and when a constant weight of 8.29 gms was obtained there were two phases. The lower phase was about one milliliter and strongly acidic. The upper layer was about eight milliliters and appeared to be a silicone fluid. The lower layer was removed carefully with a pipette and the exterior of the pipette wiped free of the upper layer with a paper towel. The lower layer and the upper layer were then applied to a glass mirror surface along with the original "Invisible Shield" to determine the Water and Soil Repellency and Durability (Test No. 1) of each. The results are presented in Table A.

It is apparent from the test results that the individually separated silicone acid components of the composition do not perform as water and soil repellent compositions, but the combination of the two, as in the "Invisible Shield" product, results in "Excellent" test ratings.

TABLE A

Phase Performance Test

|  | UPPER LAYER | INVISIBLE SHIELD | LOWER LAYER |
|---|---|---|---|
| APPLICATION | Easy | Easy | Difficult |
| Drop Contact Angle | P | E | F |
| Drop Mobility | P | E | P |
| Spray | P | E | F |
| Blow | F-P | E | G |
| Marker Repellency | F | E | P |
| Detergent Durability | F | E | P |

E = Excellent,
G = Good,
F = Fair,
P = Poor

Examples 2 to 8

Compositions Utilizing Various Solid Stabilizers 40 gms of a modified dimethysiloxane fluid (Wacker F-1006, 60,000 mol. wt.) and various solid stabilizers were hand blended to homogeneous mixtures in an 8 oz bottle with a stainless steel spatula. 5 gms of concentrated sulfuric acid was then added, to each mixture and the mixtures were again hand blended to homogeneous compositions. The various blends were evaluated on the water repellency and durability tests by placing a small amount of the blend on the spatula and depositing it on the test mirror surface followed by spreading and wiping with a paper towel to cover the test surface. The blends did not leave a hazy test surface but wiped clean and bright. Table B presents the results of the Water and Soil Repellency and Durability Test No. 1 on these blends.

"Excellent" to "Good" Water and Soil Repellency and Durability results were obtained on all of the examples. This demonstrates that the same silicone fluid and acid combination can be used with a broad range of solid stabilizers in different quantities to give the desired durable water and soil repellent compositions of this invention in forms from creams to pastes to semi solids.

TABLE B

Performance of a Silicone Fluid/Acid Combination with Various Solid Stabilizers

| EXAMPLE | 2 | 3 | 4 | 5 | 6 | 7 | 8 |
|---|---|---|---|---|---|---|---|
| Stabilizer (gms)* | SynWax (4) | PP-31 (4) | PE611XF (4) | CaSO$_4$ (50) | Sil 90 (60) | 68-S (14) | V-4 (25) |
| EVALUATIONS | Cream | Cream | Cream | Semi-solid | Paste | Semi-solid | Semi-solid |
| Drop Contact Angle | E | E | E | G | E | E | E |
| Drop Mobility | E | E | E | G-F | E | E | E |
| Spray | E | E | E | G | E | E | E |
| Blow | E | E | E | F | G | G | G |
| Marker Repellency Test No. 1 | E | E | E | G | E | E | E |
| Detergent Durability Test No. 1 | E | E | E | G | E | E | E |

E = Excellent,
G = Good,
F = Fair,
P = Poor
*SynWax = SynWax 22 XF a micronized synthetic hydrocarbon wax (Micro Powders, Inc.) (5–6 micron mean particle size)
PP-31 = Propylmatte 31, a micronized polypropylene (Micro Powders, Inc.) (8–12 micron mean particle size)
PE611XF = MPP-611XF, a micronized polyethylene (Micro Powders, Inc.) (5–6 micron mean particle size)
CaSO$_4$ = Powdered Gypsum
Sil 90 = Silcosil 90, a ground silica (U.S. Silica Co.) (80% less than 325 mesh)
68-S = Therm-O-Rock 68S, a ground perlite (Therm-O-Rock West) (20–200 mesh)
V-4 = Therm-O-Rock V-4, a ground mica (Therm-O-Rock West)

Examples 9 to 20

Compositions of Various Silicones with Sulfuric Acid and Various Solid Stabilizers The various silicones presented in Table C were hand mixed with the amount of sulfuric acid stated and then hand blended with the amount of the various solid stabilizers as shown. The resulting compositions were then tested for Water and Soil Repellency and Durability Test No. 1 and the results are presented in Table C.

"Excellent" Water and Soil Repellency and Durability tests results were obtained on all the compositions. This demonstrates the broad range of silicones and solid stabilizers which can be employed to achieve the durable water and soil repellent compositions of this invention.

TABLE C

Performance of Various Silicone Fluids with Various Solid Stabilizer Compositions

| EXAMPLE | 9 | 10 | 11 | 12 | 13 | 14 | 15 |
|---|---|---|---|---|---|---|---|
| Silicones/Acid* (gms) | | | | | | | |
| F 1006 50 Cst. | 60 | 15 | 33.6 | 30 | 15 | 150 | 13.3 |
| VS 7349 | 15 | 5 | 13.3 | 10 | 5 | | 4.4 |
| F 1079 | | 20 | | | | | |
| Sulfuric Acid | 8 | 2 | 4.5 | 4 | 2 | 50 | 2.3 |
| Stabilizer (gms)** | Mica 3X (140) | Mica 3X (42) | W 1300 (36.7) | SynWax (10) | G 146 (7) | K-1 (22) MT 10 (5) | MT 10 (2) |
| EVALUATIONS | Paste | Paste | Paste | Cream | Cream | Semi-solid | Semi-solid |

| EXAMPLE | 9 | 10 | 11 | 12 | 13 | 14 | 15 |
|---|---|---|---|---|---|---|---|
| Drop Contact Angle | E | E | E | E | E | E | E |
| Drop Mobility | E | E | E | E | E | E | E |
| Spray | E | E | E | E | E | E | E |
| Blow | E | E | E | E | E | E | E |
| Marker Repellency | E | E | E | E | E | E | E |
| Detergent Durability | E | E | E | E | E | E | E |

| EXAMPLE | 16 | 17 | 18 | 19 | 20 |
|---|---|---|---|---|---|
| Silicones/Acid (gms)* | | | | | |
| F 1006 50 Cst. | 13.3 4.4 | 20 | | | 50 |
| 100 Cst. | | 6.7 | | | |
| 350 Cst. | | | 20 | | |
| Monomer | | | | 20 | |
| Sulfuric Acid | 2.3 | 3.3 | 2 | 2 | 6 |
| Stabilizer (gms)** | G-146 (5) | K-1 (5) | K-1 (3) | K-1 (5) | W-1012 (20) |
| EVALUATIONS | Cream | Paste | Cream | Semi-solid | Paste |
| Drop Contact Angle | E | E | E | E | E |
| Drop Mobility | E | E | E | E | E |
| Spray | E | E | E | E | E |
| Blow | E | E | E | G | E |

TABLE C-continued

Performance of Various Silicone Fluids with Various Solid Stabilizer Compositions

| EXAMPLE | 9 | 10 | 11 | 12 | 13 | 14 | 15 |
|---|---|---|---|---|---|---|---|
| Marker Repellency | | E | E | E | E | E |  |
| Detergent Durability | | E | E | E | E | E |  |

E = Excellent, G = Good, F = Fair, P = Poor
*F 1006 = Modified dimethylsiloxane fluid (Wacker)
50 Cst = SWS 101, 50 centistoke dimethylpolysiloxane fluid (Wacker)
VS 7349 = Cyclic tetra/penta/polymethylsiloxane mixture (Witco Chemical)
F 1079 = Dimethylpolysiloxane fluid containing cyclic siloxanes (Wacker)
100 Cst = SWS 101, 100 centistroke dimethylpolysiloxane fluid (Wacker)
350 Cst = SWS 101, 350 centistoke dimethylpolysiloxane fluid (Wacker)
Monomer = Dimethyldiethoxysilane (Genesee)
**Mica 3X = Micronized mineralite mica (H. M. Royal of CA, Inc.) (7–11 micron mean particle size)
W-1300 = Z Light Ceramic Spheres (3M) (Avg. 125 microns)
MT-10 = Reolosil MT-10, hydrophobic silica (H. M. Royal of CA, Inc.) (Avg. 150 m$\mu$)
G-146 = Natural crystalline flake graphite (Asbury Graphite Mills, Inc.) (98% less than 44 microns)
W-1012 = Z-Light Ceramic Microspheres (3M) (Avg. 44 microns)

Examples 21 to 25

Combinations of Various Silicone Fluids and Solid Stabilizers with Other Strong Acids Various strong acids presented in Table D were hand mixed with the various amounts of the silicone fluids and solid stabilizers as shown. The resulting compositions were then tested for Water and Soil Repellency and Durability (Test No. 1) and the results are presented in Table D.

"Excellent" to "Good" Water and Soil Repellency and Durability (Test No. 1) results were obtained on all the compositions. This further demonstrates the broad use of strong acids with various silicone fluids and solid stabilizers which can be employed to achieve the durable water and soil repellent compositions of this invention.

TABLE D

Compositions Employing Other Strong Acids

| EXAMPLE | 21 | 22 | 23 | 24 | 25 |
|---|---|---|---|---|---|
| Blend (gms) |  |  |  |  |  |
| Silicones |  |  |  |  |  |
| F 1006 | 15 | 15 | 40 |  | 20 |
| 100 Cst |  |  |  | 50 |  |
| 350 Cst | 5.8 | 5 |  |  |  |
| Acids |  |  |  |  |  |
| Trifluoromethane Sulfonic | 4.3 |  |  |  |  |
| Ethane Sulfonic (70% aq) |  | 4 |  |  |  |
| Ammonium Bifluoride |  |  | 6* |  |  |
| Oleum ($H_2SO_4$ + $SO_3$) |  |  |  | 7 |  |
| p-Toluenesulfonic Acid |  |  |  |  | 2.5** |
| Stabilizer | K-1 (3) | K-1 (2) | PP-31 (24) | SynWax (20) | Mica 3X (22.5) |
| EVALUATIONS | Cream | Cream | Cream | Cream | Paste |
| Drop Contact Angle | E | E | E | E | E |

TABLE D-continued

Compositions Employing Other Strong Acids

| EXAMPLE | 21 | 22 | 23 | 24 | 25 |
|---|---|---|---|---|---|
| Drop Mobility | G | E | E | E | G |
| Spray | E | E | E | E | E |
| Blow | E | E | E | E | E |
| Marker Repellency | G | G | E | E | G |
| Detergent Durability | G | G | G | E | G |

E = Excellent,
G = Good,
F = Fair,
P = Poor
*20 gms of ammonium bifluoride crystal was intensely blended in a Waring type blender with 80 gms of Propylmatte 31 and 30 gms of the blended composition was employed in blend 23
**10 gms of p-toluenesulfonic acid was intensely blended in a Waring type blender with 90 gms of Mica 3X (micronized mica) and 25 gms of the blended composition was employed in blend 25

Examples 26 to 31

Compositions of Various Additives with a Silicone Fluid Blend, Sulfuric Acid and Various Solid Stabilizers Various silicone fluid/sulfuric acid/solid stabilizer blends were hand mixed and then blended with the various additives as shown in Table E.

Example 26: The silicone and acid were reacted by hand blending and the mica added and mixed to a stiff paste. The DBDEG was then added to yield a less stiff paste.

Example 27: The silicone, S-100, the acid and the K-1 glass spheres were all mixed together to yield a soft paste.

Example 28: The melted stearic acid and the silicone were hand mixed hot. Two liquid phases resulted. The acid and the K-1 glass spheres were added to the hot two phases and hand mixed. The mixture was then cast into a plastic mold and allowed to solidify.

Example 29: The melted GMS, silicone and acid were hand mixed hot. Two liquid phases resulted. The Mica 3X was then added to the hot two phases and hand mixed. The mixture was then cast into a plastic mold and allowed to solidify.

Example 30: The melted Wax 180, silicone and acid were hand mixed hot. Two liquid phases resulted. The Mica 3X was then added to the hot two phases and hand mixed. The mixture was then cast into a plastic mold and allowed to solidify.

Example 31: The melted Wax 835, silicone and acid were hand mixed hot. Two liquid phases resulted. The Mica 3X was then added to the hot two phases and hand mixed. The mixture was then cast into a plastic mold and allowed to solidify.

The resulting compositions in the above Examples 26–31 were then tested for Water and Soil Repellency and Durability (Test No. 1) and the results are presented in Table E.

"Excellent" to "Good" Water and Soil Repellency and Durability (Test No. 1) results were generally obtained on all of the compositions. This further demonstrates the broad use of the compositions of this invention in the preparation of various forms of durable water and soil repellent compositions that can be achieved by the teachings of this invention.

TABLE E

Liquid and Solid Additive Compositions

| EXAMPLE | 26 | 27 | 28 | 29 | 30 | 31 |
|---|---|---|---|---|---|---|
| Silicones (gms) | | | | | | |
| F 1006 | 15 | 16.6 | 6 | 6 | 12 | 12 |
| 50 Cst | 5 | 5.6 | 2 | 2 | 4 | 4 |
| Sulfuric Acid (gms) | 2 | 3.5 | 0.8 | 0.8 | 1.6 | 1.6 |
| Stabilizer (gms) | Mica 3X (120) | K-1 (8) | K-1 (2) | Mica 3x (30) | Mica 3X (50) | Mica 3X (50) |
| Additive (gms)* | DBDEG (22) | S-100 (25) | Stearic Acid (10) | GMS (10) | Wax 180 (20) | Wax 835 (20) |
| Procedure | Hand mixed | Hand mixed | Melted, Mixed, Solidified | Melted, Mixed, Solidified | Melted, Mixed, Solidified | Melted, Mixed, Solidified |
| EVALUATIONS** | | | | | | |
| Drop Contact Angle | G | E*** | G | E*** | E | E |
| Drop Mobility | F | E | G | E | E | E |
| Spray | E | G | G | E | E | E |
| Blow | E | G | G | E | G | G |
| Marker Repellency | E | E | E | E | E | E |
| Detergent Durability | E | E | E | E | E | E |

E = Excellent,
G = Good,
F = Fair,
P = Poor
*DBDEG = Dibutyldiethyleneglycol (Grant Chemical)
S-100 = Biosoft 100, Linear alkylbenzenesulfonate
GMS =Glycerolmonostearate (Emery Industries)
Wax 180 = Hard Wax Hydrocarbon 180 (Witco)
Wax 835 = Soft Wax Hydrocarbon 835 (Witco)
**Solids were applied by swiping the solid several times across the mirror surface and then spreading the material applied with a paper towel across the surface of the mirror until clear
***E ratings were obtained after a water wash of the surface to remove residual S-100 and GMS which are known wetting agents that tend to reduce water repellency

Example 32

Performance on Glazed Ceramic Tile

The composition of Example 12 (30 gms F 1006, 10 gms 50 Cst, 4 gms Sulfuric Acid, 10 gms SynWax) was applied to half of a 12"×12" glazed ceramic tile in the same manner as when applied to a glass mirror surface. The other half of the tile was left untreated for comparison. Both sides of the tile were then tested for Water and Soil Repellency and Durability (Test No. 1) on the treated and untreated surfaces. The results are presented in Table F.

"Excellent" to "Good" Water and Soil Repellency and Durability test results were obtained for the treated side of the glazed tile. Two "Fair" and four "Poor" test results were obtained for the untreated glazed tile surface. This demonstrates the further utility of the compositions of this invention to treat nonporous surfaces.

TABLE F

Treatment of Glazed Ceramic Tile

| | TREATED SURFACE | UNTREATED SURFACE |
|---|---|---|
| Wiping With Paper Towel | Smooth | Some Surface Drag |
| Drop Contact Angle | E | F |
| Drop Mobility | G | F |
| Spray | E | P |
| Blow | E | P |
| Marker Repellency | E | P |
| Detergent Durability | G | P |

E = Excellent,
G = Good,
F = Fair,
P = Poor

Example 33

High Intensity Blender Preparation of Durable Water and Soil Repellant Compositions 29 gms. of hollow glass bubbles (K-1 from 3M) were placed into the Waring type blender and the top cover, modified with a small hole for the injection of liquids, was put in place to seal the blender. The blender was then turned on at a moderate blending speed and 50 gms of silicone fluid (50 Cst, Wacker Silicones) was added slowly over a few minutes by means of a syringe through the addition hole in the blender top. 150 gms of a modified dimethylsilicone fluid (F-1006, Wacker Silicones) was then added in a similar manner with continuous blending. The total mix was blended for an additional one minute. The blender was then opened and the sides of the blender scraped with a rubber spatula and then the blender was turned on for an additional minute of mixing. A smooth cream textured mix was obtained.

25 gms of concentrated sulfuric acid was then added with blending in a similar manner. The mix thickened and then thinned to a creamy paste. The blender was stopped and the top cover was removed and 5 gms of a fine silica (MT-10, H. M. Royal of CA, Inc.) was added on top of the paste. The blender was again turned on for an additional minute. The resulting mix was a smooth semisolid paste.

Testing of the composition for Water and Soil Repellency and Durability (Test No. 1) resulted in "Excellent" scores in all test categories.

Example 34

Coverage Determination 0.68 gms of a blend of 60 gms of a functional dimethylsilicone fluid (F-1006), 15 gms of a 50 Cst dimethylsilicone fluid, 8 gms of sulfuric acid and 140 gms Mica 3X was applied on the surface of a 1.63 gm polyolefin closed cell foam sponge. A large sheet of window glass was then coated with the material by wiping the sponge over the surface using a firm, circular and overlapping motion. The point at which the glass was sufficiently treated was determined by the ease of movement of the sponge over the surface of the glass. The area of the coated glass was then ascertained by spraying with water. An area of about 27"×15" was determined to have a water and soil repellent coating. The sponge was then weighed again and it was determined that only 0.08 gms of the water and soil repellent composition had been used to coat the treated area.

This result calculates to a coverage of approximately 1000 sq ft per ounce of material, compared to a coverage of 25 sq ft per ounce for typical solvent based compositions.

Example 35

Water and Soil Repellent Composition Paste

In this example, a semi-solid paste was made with a liquid additive to illustrate a composition which does not require the advantage of being solventless. However, in this form of a paste, other advantages of this invention are secured. The stabilizing effect of the solid stabilizer is achieved for the two dispersed phases of silicone and acid, each or both of which have been extended with ethanol.

105 gms of "Invisible Shield", a commercially available solvent based water and soil repellent composition described previously, was placed in a beaker with a magnetic stirrer and heated on a hot plate with a stream of air passing over the surface to assist in the evaporation of the solvent. Solvent was removed until two phases were observed when the mixture turned cloudy.

The residual weighed 15.29 gms and was about a 60/40 volume split between upper and lower layers. It was previously determined that "Invisible Shield" contained 8.29% non volatile liquids and therefore the non volatile components in this experiment would be 8.70 gms. This result indicates that there were 6.59 gms of ethanol remaining in the two-phase 15.29 gm residue.

10 gms of SynWax 22 XF were hand blended with the 15.29 gm residue to yield a semi-solid paste containing a dispersion of the two phases stabilized by the wax. An ethanol odor was noted from the blended composition on application to the mirror surface for testing. However, no haze developed on application of the composition to the mirror surface. "Excellent" results were obtained on all Water and Soil Repellency and Durability Tests (Test No. 1).

This example further demonstrates the broader aspect of the invention for the application of a composition containing a dispersion of two phases, in the presence of a liquid additive, and a solid stabilizer in an effective amount to stabilize the dispersion.

Example 36

Powdered Water and Soil Repellent Composition 40 gms of F 1006, a modified dimethylsiloxane fluid supplied by Wacker, and 5 gms of concentrated sulfuric acid were hand mixed in an 8 ounce bottle with a stainless steel spatula. The mixture thinned, and then separated. On continued mixing the mixture thinned and then separated into two phases on standing.

50 gms of finely ground perlite (Thermolite T-100 supplied by Therm-O-Rock West of Phoenix, Ariz.) was placed in a Waring blender and 16 gms of the F 1006/Sulfuric Acid blended reaction product added slowly through the addition hole in the top of the blender by means of a syringe while blending continuously at a moderate speed. The blender was then opened and the sides of the blender scraped with a rubber spatula and the blender was again turned on for additional blending. A powdered composition resulted.

The resulting powder was applied to a glass mirror and spread across the surface of the mirror with a dry sponge. The excess powder was then removed and the coated mirror tested for Water and Soil Repellency and Durability (Test No. 1). The results are presented in Table G.

TABLE G

Powdered Composition Water and Soil Repellency and Durability Test Results

| TEST | RESULT |
| --- | --- |
| Drop Contact Angle | E |
| Drop Mobility | G |
| Spray | E |
| Blow | E |
| Marker Repellency | G |
| Detergent Durability | G |

E = Excellent,
G = Good

"Excellent" to "Good" results were obtained for the Water and Soil Repellency and Durability Test (Test No. 1) of the powdered water and soil repellent composition.

Example 37

Textured Surface Performance

A 12"×12" piece of sandblasted glass (one side) was divided into three sections. One section was treated three times with "Invisible Shield", a solvent based water and soil repellent composition, allowing the surface to dry between applications. Another section was treated with the composition of Example 12 (a cream) (30 gms F1006, 10 gms 50 cst, 4 gms sulfuric acid, 10 gms SynWax) and another section was left untreated. The sections were evaluated for Water and Soil Repellency and Durability and the results are summarized in Table H.

TABLE H

Treatment of Textured Surface

| MATERIAL | EXAMPLE 12 (Cream) | INVISIBLE SHIELD (Solvent Based) | NONE |
|---|---|---|---|
| Drop Contact Angle | E | F | F |
| Drop Mobility | G | F | P |
| Spray | E | F | F |
| Blow | F | P | P |
| Marker Repellency | F* | F* | P |
| Detergent Durability | F* | F | P |

E = Excellent,
G = Good,
F = Fair,
P = Poor
*Marker can be removed from the surface by rubbing with a paper towel The performance of the cream, Example 12 composition, on the water and soil repellency tests was superior to the solvent-based material, "Invisible Shield" and both were a distinct improvement over the untreated surface.

The surface treated with the cream outperformed the solvent based material in terms of durability in that the black streak from the marker could be easily removed from that surface by rubbing with a paper towel whereas the streak on the solvent based treated surface could not be removed.

Examples 38–42

Hand Mixed Compositions Table I

The dimethylsilicone fluids and the solid stabilizer were hand blended to a homogeneous mix in an 8 oz bottle with a stainless steel spatula. The acid was then added, and the mixture was again hand blended to a homogeneous composition.

The hand mixed compositions were then evaluated for the Water Repellency and Durability according to Test No. 2, and were also tested for acid sequestering using the Acid Availability Test. The results are presented in Table I.

TABLE I

| EXAMPLE | 38 | 39 | 40 | 41 | 42 | 43 | 44 |
|---|---|---|---|---|---|---|---|
| Silicones/Acid* (gms) | | | | | | | |
| F 1006 | 40 | 40 | 40 | 30 | | 150 | 14.2 |
| DMF 50 | | | | 10 | | 50 | |
| DMF 100 | | | | | 50 | | |
| Sulfuric Acid | 5 | 5 | 5 | 4 | | 25 | 1.8 |
| Oleum | | | | | 7 | | |
| Stabilizer** (gms) | SynWax 4 | PE 611XF 4 | 68-S 14 | SynWax 10 | SynWax 20 | K-1 29 MT 10 5 | T-100 50 |
| WATER REPELLENCY AND DURABILITY TESTS | | | | | | | |
| Drop Contact Angle | E | E | E | E | E | E | E |
| Drop Mobility | E | E | E | E | E | E | G |
| Spray | E | E | E | E | E | E | E |
| Blow | E | E | G | E | E | E | E |
| Marker Repellency Test No. 2 | E | E | E | E | E | E | G |
| ACID AVAILABILITY TESTS | | | | | | | |
| % H+ | 10.2 | 10.2 | 8.47 | 7.41 | 9.7 | 9.65 | 2.70 |
| SAMPLE (gm) | 14.70 | 14.70 | 17.70 | 20.24 | 15.46 | 15.54 | 55.56 |
| TIME (sec) | 10 | 15 | 12 | 15 | 10 | 10 | 30 |

E = Excellent, G = Good, F = Fair, P = Poor
*F 1006 = Modified dimethylsiloxane fluid (Wacker)
DMF 50 = SWS 101, 50 centistoke dimethylpolysiloxane fluid (Wacker)
DMF 100 = SWS 101, 100 centistoke dimethylpolysiloxane fluid (Wacker)
Oleum = 30% $SO_3$ in sulfuric acid
**SynWax = SynWax 22 XF a micronized synthetic hydrocarbon wax (Micro Powders, Inc.) (5–6 micron mean particle size)
PE611XF = MPP-611XF, a micronized polyethylene (Micro Powders, Inc.) (5–6 micron mean particle size)
68-S = Therm-O-Rock 68S, a ground perlite (Therm-O-Rock West) (20–200 mesh)
K-1 = Hollow glass bubbles (3M)
MT-10 = Reolosil MT-10, hydrophobic silica (H.M. Royal of CA, Inc.) (Avg. 150 m$\mu$)
T-100 = Thermolite T-100, ground perlite (Therm-O-Rock West) (about 110 micron average particle size)

"Excellent" to "Good" Water and Soil Repellency and Durability (Test No. 2) results were obtained for all hand mixed examples. The Acid Availability Test results all indicate very poor times of 15 seconds or less. These hand mixed compositions, while being excellent water and soil repellents with good durability, have high levels of readily available acid.

Example 43

High Intensity Blender Preparation of Durable Water and Soil Repellant Compositions 29 gms of hollow glass bubbles (K-1 from 3M) were placed into the Waring type blender and the top cover, modified with a small hole for the injection of liquids, put in place to seal the blender. The blender was then turned on at a moderate blending speed and 50 gms of silicone fluid (50 Cst, Wacker Silicones) was added slowly over a few minutes by means of a syringe through the addition hole in the blender top. 150 gms of a modified dimethylsilicone fluid (F-1006, Wacker Silicones) was then added in a similar manner with continuous blending. The total mix was blended for an additional one minute. The blender was then opened and the sides of the blender scraped with a rubber spatula and then the blender was turned on for an additional minute of mixing. A smooth cream textured mix was obtained.

25 gms of concentrated sulfuric acid was then added with blending in a similar manner. The mix thickened and then thinned to a creamy paste. The blender was stopped and the top cover was removed and 5 gms of a fine silica (MT-10, H. M. Royal of CA, Inc.) was added on top of the paste. The blender was again turned on for an additional minute. The resulting mix was a smooth semisolid paste.

Again, testing of the resulting material (Table H) for Water and Soil Repellency and Durability (Test No. 2) resulted in "Excellent" results in all test categories. However, the Acid Availability Test resulted in a very poor time of 10 seconds. This high intensity blended composition, while being an excellent water and soil repellent with good durability, has a high level of readily available acid.

Example 44

Powdered Water and Soil Repellant Composition 40 gms of F 1006, a modified dimethylsiloxane fluid supplied by Wacker, and 5 gms of concentrated sulfuric acid were hand mixed in an 8 ounce bottle with a stainless steel spatula. The mixture thickened and was slightly exothermic. On continued mixing the mixture thinned and separated into two phases on standing.

50 gms of finely ground perlite (Thermolite T-100 supplied by Therm-O-Rock West of Phoenix, Ariz.) was placed in a Waring blender and 16 gms of the F 1006/sulfuric acid blended reaction product added slowly through the addition hole in the top of the blender by means of a syringe while blending continuously at a moderate speed. The blender was then opened and the sides of the blender scraped with a rubber patula and the blender was again turned on for additional blending. A powdered composition resulted.

The resulting powder was applied to a glass mirror and spread across the surface of the mirror with a dry sponge. The excess powder was then removed and the coated mirror tested for Water and Soil Repellency and Durability (Test No. 2) and Acid Availability (Table Q).

"Excellent" to "Good" results were obtained on the Water and Soil Repellency and Durability (Test No. 2) for the powdered water and soil repellent composition. However, the Acid Availability Test resulted in a very poor time of 30 seconds. This high intensity mixed powdered composition, while being a good water and soil repellent with good durability, has a high level of readily available acid.

Examples 45–66

Water & Soil Repellency, Durability and Acid Availability of Microparticulate Silicone Surface Care Compositions (Table J)

The microparticulate silicone surface care composition evaluation results are presented in Table J. The preparation of these compositions were conducted at different batch sizes and under different mixing conditions. The following general description details the process procedures employed for the compositions in Table J.

A. 1.5 Liter Batch Size in the Laboratory (L)

The desired amounts of silicone fluid(s) were weighed into a 1.5 liter glass beaker and the desired amount of stabilizer added on top of the silicone fluid. The stabilizer and silicone fluid were then hand blended with a rubber spatula in order to wet out the stabilizer with the silicone.

The mixture was then subjected to a brief high shear mixing using a Silverson laboratory high shear mixer, Model L5RT, employing a general purpose mixing head with the pumping modification. A smooth cream resulted.

The desired amount of sulfuric acid was then added and the composition blended under high shear at 6000 RPM using an up and down motion of the mixing head to insure good mixing. High shear was continued until the temperature of the blend reached 50° C. The mixing was then stopped and the composition packaged in a sealed plastic bottle for evaluations.

B. 1 Gallon Batch Size/High Shear Mixing in the Laboratory (G)

The procedure employed was nearly identical to Procedure A, the 1.5 liter batch size, except that a 4000 ml glass beaker was employed for the larger quantities of materials used.

C. 55 Gallon Drum Batch Size/High Shear Mixing in the Pilot Plant (D)

In a similar manner, the desired silicone fluid(s) were weighed into a 55 gallon, open-top, plastic drum. The desired amount of the stabilizer was then weighed and added on top of the silicone and the mixture hand blended with a large paddle to wet the stabilizer with the silicone fluid. The mixture was then subjected briefly to high shear mixing to form a smooth cream by using a Silverson high shear production mixer, Model FX 60, which runs at a constant speed of 3800 RPM with the general purpose mixing head.

The high shearing was stopped and the desired amount of acid was added. The mixture was then subjected to the high shear mixing with the Silverson production mixer using an up and down and circular motion to insure complete mixing. When the temperature of the batch reached 50° C., the high shear mixing was discontinued and the batch was completed. The drum was sealed for evaluations.

D. 1.5 Liter Batch Size using a Squirrel Mixer with a Power Drill Drive (LS) (Examples 65 and 66)

Two batches of the same microparticulate silicone surface care composition were prepared using a squirrel mixer with a drill power drive (similar to mixing paint).

One batch (Example 65) was mixed for 210 minutes during which the temperature rose from 24.5° to 30° C. The composition was transferred to a plastic bottle for evaluation.

For the other batch (Example 66), the creamed silicone and stabilizer blend was slowly heated on a hot plate to 47° C. with gentle mixing. The sulfuric acid was then added and the mixture stirred for 210 minutes while the temperature dropped to 39° C. The composition was transferred to a plastic bottle for evaluation.

TABLE J

| EXAMPLE | 45 | 46 | 47 | 48 | 49 | 50 | 51 |
|---|---|---|---|---|---|---|---|
| PROCESS* | G | G | L | G | G | D | G |
| Sulfuric Acid (%/Wt.) | 2.5 | .10 | 2.5 | 2.5 | 5.51 | 3.5 | 2.5 |
| Silicones (% Wt.) | | | | | | | |
| DMF 350 | 77.5 | 53 | 32.1 | | | | 32.1 |
| DMF 50 | | | 32.1 | 64.2 | 55.3 | 56.5 | 32.1 |
| Stabilizer (% Wt.) | | | | | | | |
| Spray Wax 40 | 20 | 37 | 33.3 | 33.3 | 39.2 | 40 | 33.3 |
| WATER REPELLENCY AND DURABILITY TESTS | | | | | | | |
| Drop Contact Angle | E | E | E | E | E | E | E |
| Drop Mobility | E | E | E | E | E | E | E |
| Spray | E | E | E | E | E | E | E |
| Blow | E | E | E | E | E | E | E |
| Marker Repellency Test No. 2 | E | E | E | E | E | E | E |
| ACID AVAILABILITY TESTS | | | | | | | |
| SAMPLE (gm) | 58.86 | 15.0 | 58.86 | 58.86 | 17.22 | 42.85 | 58.86 |
| TIME (min) | 75 | 1/3 | 80 | 65 | 23 | 75 | 105 |

| EXAMPLE | 52 | 53 | 54 | 55 | 56 | 57 | 58 | 59 |
|---|---|---|---|---|---|---|---|---|
| PROCESS* | D | G | G | G | G | L | L | G |
| Sulfuric Acid (%/Wt.) | 2.5 | 4.38 | 2.5 | 10 | 2.5 | 2.5 | 2.3 | 2.5 |
| Silicones (% Wt.) | | | | | | | | |
| DMF 350 | 77.5 | 36.26 | 32.1 | | | 28.75 | 72.2 | 32.75 |
| DMF 50 | | 36.26 | 32.1 | | | 28.75 | | 32.75 |
| DMF 20 | | | | 53.1 | 57.5 | | | |
| Stabilizer (% Wt.) | | | | | | | | |
| Spray Wax 40 | 20 | | | 26.9 | 40 | | | |
| SynWax 22XF | | 23.1 | 33.3 | | | | | |
| Mica 3X | | | | | 40 | | | |
| Perlite T-100 | | | | | | | 25.5 | |
| Spray Wax 105 | | | | | | | | 32 |
| WATER REPELLENCY AND DURABILITY TESTS | | | | | | | | |
| Drop Contact Angle | E | E | E | E | E | E | E | E |
| Drop Mobility | E | E | E | E | E | E | E | E |
| Spray | E | E | E | E | E | E | E | E |
| Blow | E | E | E | E | E | E | E | E |
| Marker Repellency Test No. 2 | E | E | E | E | E | E | E | E |
| ACID AVAILABILITY TESTS | | | | | | | | |
| SAMPLE (gm) | 58.86 | 34.28 | 58.86 | 15.0 | 58.86 | 58.86 | 63.78 | 58.86 |
| TIME (mm) | 70 | 80 | 60 | 1/2 | 44 | 1/2 | 20 | 105 |

| EXAMPLE | 60 | 61 | 62 | 63 | 64 | 65 | 66 |
|---|---|---|---|---|---|---|---|
| PROCESS* | L | L | L | L | L | LS | LS |
| Sulfuric Acid (%/Wt.) | 2.5 | 2.5 | 2.5 | 2.5 | 2.5 | 2.5 | 2.5 |
| Silicones (% Wt.) | | | | | | | |
| DMF 50 | 64.2 | 64.2 | 64.2 | 64.2 | 28.75 | 28.75 | 28.75 |
| TPR | | | | | 28.75 | | |
| DMF 350 | | | | | | 28.75 | 28.75 |

TABLE J-continued

| Stabilizer (% Wt.) | | | | | | | |
|---|---|---|---|---|---|---|---|
| MPP-611XF | 33.3 | | | | | | |
| PropylTex20 | | 33.3 | | | | | |
| Epolene N34P | | | 33.3 | | | | |
| Epolene N15M | | | | 33.3 | | | |
| Spray Wax 40 | | | | | 40 | 40 | 40 |
| WATER REPELLENCY AND DURABILITY TESTS | | | | | | | |
| Drop Contact Angle | E | E | E | E | E | E | E |
| Drop Mobility | E | E | E | E | E | E | E |
| Spray | E | E | E | E | E | E | F |
| Blow | E | E | E | E | E | E | E |
| Marker Repellency Test No. 2 | E | E | E | E | E | E | E |
| ACID AVAILABILITY TESTS | | | | | | | |
| SAMPLE (gm) | 58.86 | 58.86 | 58.86 | 58.86 | 58.86 | 58.86 | 58.86 |
| TIME (mm) | 165 | 1/2 | 3½ | 120 | 60 | 8 | 20 |

\*L = 1.5 liter - LAB High Shear
D = 55 gallon drum - PLANT
G = 1 gallon - LAB High Shear
LS = 1.5 liter - LAB Squirrel Mixer
Silicones
DMF 350: a polydimethylsilicone fluid with 350 centistoke viscosity
DMF 50: a polydimethylsilicone fluid with 50 centistoke viscosity
DMF 20: a polydimethylsilicone fluid with 20 centistoke viscosity
TPR: a polydimethylsilicone with alkyl-silsequioxanes from Wacker, Adrian, MI with 250 centistoke viscosity
Stabilizers
Spray Wax 40: a 15 micron mean particle size wax, Drop Melting Point 114° C., penetration 23 @ 65° C. and 1 @ 25 from Moore & Munger, Shelton, CT
SynWax 22XF: a 5 micron mean particle size wax, Melting Point 102–106° C., penetration 2 @ 25° C. from Micro Powders, Tarrytown, NY
Mica 3X: a potassium aluminosilicate, 7–11 micron mean particle size, hardness 2.5–3.0 from H.M. Royal, Buena Park, CA
Perlite T-100: a finely ground 110 micron average particle size expanded perlite from Therm-O-Rock West, Chandler, AZ
Spray Wax 105: a 7 micron wax, Drop Melting Point 117° C., penetration 6 @ 65° C. and 1 at 25 from Moore & Munger, Shelton, CT
MPP 611XF: a 5–6 micron mean particle size polyethylene wax, Melting Point 110° C., penetration 1 @ 25° C. from Micro Powders, Tarrytown, NY
PropylTex 20: a 270–300 micron polypropylene wax, Melting Point 167° C., from Micro Powders, Tarrytown, NY
Epolene N34P: a ground polyethylene wax, Softening Point 103° C., penetration 5 @ 27° C. from Eastman, Longview, TX
Epolene N15M: a 6–10 micron mean particle size polypropylene wax, Softening Point 163° C., penetration 1 @ 25° C.

The Examples of Table J demonstrate that a wide range of formulations will provide excellent water and soil repellency and durability when applied to nonporous surfaces. However, the Acid Availability Test demonstrates significant variation in the level of acid sequestering, with results varying considerably from less than a minute, i.e., Examples 46, 55, 57 and 61, to over an hour, i.e., Examples 45, 47, 48, 50, 51, 52, 53, 54, 58, 59, 60, 63 and 64, and even as much as 2 hours, i.e, Examples 60 and 63.

It is apparent that hand mixing (Table I, Examples 38–42) and Squirrel Mixing (Table J, Examples 65 and 66), even for extended periods of time and at elevated temperatures, yields excellent microparticulate surface care compositions but such mixing provides relatively poor acid sequestering. Examples 65 and 66 also demonstrate that extended squirrel mixing for 210 minutes results in an Acid Availability Test of only 8 minutes (Example 65) and the same mixing at an elevated temperature of 47 to 39° C. results in an Acid Availability Test improvement to only 20 minutes. Thus, both extended mixing time and increased mixing temperature improve the level of acid sequestering as measured by the Acid Availability Test. This is believed to result from increased acid impact on the stabilizer surface promoting increased "sequestering" of the acid by the stabilizer.

Another factor that is a major influence on the ability to beneficially sequester the acid is the amount of acid used in compositions. High acid content, i.e., Examples 46 @ 10% and 56 @ 10%, resulting in poor acid sequestering times of less than one minute. It is believed that the stabilizer used in the compositions can "sequester" a limited amount of acid on its surface and that the excess or "non-sequestered" acid is readily available as measured by the Acid Availability Test.

Reduced acid levels, i.e., Example 49 @ 5.51%, AAT=23 minutes; Examples 45, 47, 48, 50, 51 and 52 @ 2.5% to 3.5%, AAT=65 to 105 minutes, greatly improve results - - - all with the same stabilizer, Spray Wax 40, a 15 micron mean particle size, spherical particle wax employed at 40% to 20% Wt. levels.

Other finely divided stabilizers also provide good to excellent acid sequestering results.

Example 58: Perlite T-100, a finely ground, expanded perlite having an average particle size of about 110 microns employed at 25.5% Wt. - - - AAT-20 minutes.

Example 59: Spray Wax 105, a 7 micron mean particle size, spherical wax employed at 32% Wt. - - - AAT-=105 minutes.

Examples 54 and 55: Syn Wax 22XF, a 5 micron mean particle size, ground (irregular shape) wax. Example 54:

23.1% Wt. wax - - - AAT=80 minutes. Example 55: 33.3% wax - - - AAT=60 minutes.

Example 60: MPP 611XF, a 5–6 micron mean particle size, ground polyethylene wax employed at 33.3% Wt. - - - AAT=165 minutes.

Example 63: Epolene N15M, a 6–10 micron mean particle size, ground polypropylene wax at 33.3% Wt. - - - AAT=120 minutes.

However, other finely divided stabilizers do not give good Acid Availability Tests.

Example 57: Mica 3X, a 7–11 micron mean particle size, ground potassium aluminosilicate employed at the 40% Wt. level - - - AAT=30 seconds.

Stabilizers of ground (coarse) polypropylene, i.e., PropylTex 20, a 270–300 micron size, and a similarly ground (coarse) polyethylene, i.e., Epolene N34P, having large particle size and therefore less surface area/gram to "sequester" the acid, resulted in poor Acid Availability Tests, i.e., Example 61: PropylTex 20 - - - AAT=30 seconds and Example 62: Epolene N34P - - - AAT=3½ minutes.

Thermolite T-100 is an "expanded" perlite manufactured by heating the mineral perlite to high temperatures which causes the water of hydration to change to a gas thus producing an expanded perlite. T-100 is manufactured by grinding the expanded perlite. It demonstrates that porous solid stabilizers can also be employed in the compositions (Example 58-AAT=20 min.).

Examples 67–71

Toxicological Test Results on Compositions of Examples 54 and 60

It was observed in the laboratory and in the pilot plant that when working with the microparticulate silicone care compositions there was no sign of skin irritation upon exposure of the various compositions to the personnel. Since the compositions contained acid, particularly anhydrous sulfuric acid, it was decided to evaluate the toxicology of various compositions. This is a requirement for the design of a safe consumer product.

The toxicological tests were run by Tox Monitor Laboratories, Inc., 33 West Chicago Avenue, Oak Park, Ill. and the results reported as follows:
A. Primary Dermal Irritation Tests Example 67

A sample of the Example 54 product was tested for primary dermal irritation in accordance with FHSA/CPSC Guidelines, 16 CFR 1500. The sample was applied at a dose of 0.5 ml per site to unabraded and abraded skin sites on a clipped area of each of six albino rabbits. The test sites were occluded and the test material remained on the skin for a 24 hour contact period. The application sites were graded for indications of skin reactions at 24 and 72 hours after sample application. The primary dermal irritation score was 0.46, indicating that the sample is not a primary dermal irritant in accordance with FHSA/CPSC Guidelines, 16 CFR 1500. Accordingly, the sample of the invention was physiologically acceptable to epithelial tissue.

Example 68

A sample of the Example 60 product was tested for primary dermal irritation in accordance with FHSA/CPSC Guidelines, 16 CFR 1500. The sample was applied at a dose of 0.5 ml per site to unabraded and abraded skin sites on a clipped area of each of six albino rabbits. The test sites were occluded and the test material remained on the skin for a 24 hour contact period. The application sites were graded for indications of skin reactions at 24 and 72 hours after sample application. The primary dermal irritation score was 0.42, indicating that the sample is not a primary dermal irritant in accordance with FHSA/CPSC Guidelines, 16 CFR 1500. Accordingly, this sample of the invention was also physiologically acceptable to epithelial tissue.
B. Eye Irritation Example 69

A sample of the Example 54 product was tested for primary eye irritation in accordance with FHSA/CPSC Guidelines, 16 CFR 1500. The sample was administered into one eye of each of six albino rabbits. The eyes were observed and scored at 24, 48 and 72 hours. Instillation of sample into the eyes of rabbits produced no positive eye irritation reactions in any of the six test subjects. In accordance with FHSA/CPSC Guidelines, the sample is not an eye irritant. Accordingly, the sample of the invention was physiologically acceptable to epithelial tissue.

Example 70

A sample of the Example 60 product was tested for primary eye irritation in accordance with FHSA/CPSC Guidelines, 16 CFR 1500. The sample was administered into one eye of each of six albino rabbits. The eyes were observed and scored at 24, 48 and 72 hours. Instillation of sample into the eyes of rabbits produced no positive eye irritation reactions in any of the six test subjects. In accordance with FHSA/CPSC Guidelines, the sample is not an eye irritant. Accordingly, this sample of the invention was also physiologically acceptable to epithelial tissue.

Example 71

Acute Oral Toxicity on Example 64 (AAT=60 min)

A sample of Example 64 was tested for acute oral toxicity in accordance with FHSA/CPSC Guidelines, 16 CFR 1500. A white cream was administered by gavage at a dose of 5 ml/kg body weight to five male and five female rats. There was no mortality during the 14 day observation period. The acute oral LD50 of the sample was found to be greater than 5 ml/kg body weight. Therefore, the sample identified as Example 64 is not toxic by oral ingestion in accordance with FHSA/CPSC Guidelines. Accordingly, the sample of the invention was physiologically acceptable to epithelial tissue.

Example 72–73

Department of Transportation (DOT) Corrosion Test of Compositions of 54 and 60.

The DOT Corrosion Test was run by SGS U.S. Testing Company, Inc., 291 Fairfield Avenue, Fairfield, N.J., and reported as follows. Testing was performed in accordance with method as specified in 49 CFR 173.137(c)(2), ASTM G31-72. The conditions were:

Temperature: 55° C.

Agitation: none

Volume to Area Ratio: 250 ml/in$^2$

Time: 168 hours

Cleaning: Steel: no cleaning necessary Aluminum: no cleaning necessary

Example 72

The results for a sample of the Example 54 product were:

|  | Corrosion Rate | |
| --- | --- | --- |
|  | mm/yr | in/yr |
| Aluminum 7075 T-6 Bare | 0.12 | 0.005 |
|  | 0.13 | 0.005 |
| Steel SAE 1020 | 1.89 | 0.074 |
|  | 1.91 | 0.075 |

Example 73

The results for a sample of Example 60 product were:

|  | Corrosion Rate | |
| --- | --- | --- |
|  | mm/yr | in/yr |
| Aluminum 7075 T-6 Bare | 0.14 | 0.006 |
|  | 0.16 | 0.006 |
| Steel SAE 1020 | 0.52 | 0.021 |
|  | 0.56 | 0.022 |

According to the specification of 49 CFR 173.137(c)(2), a liquid is considered to have a severe corrosion rate if its corrosion rate exceeds 6.25 mm (0.246 in) a year on steel (SAE 1020) or aluminum (nonclad 7075 T-6) at a test temperature of 55° C. (131° F.). Thus, the samples of this invention were non-corrosive according to ASTM G31-72.

Non-stick Properties—Charred Food Product Testing

A. Preparation of Test Panels

10"×10" glass mirrors and 12"×12" ceramic tiles were cleaned with an abrasive cleaner (i.e., Miracle Scrub" produced by Unelko Corp., Scottsdale, Ariz.) using a soft sponge followed by a hot water rinse and paper towel drying. The test panels were then allowed to equilibrate overnight to laboratory room conditions prior to the application of the water and soil resistant coatings.

One clean glass mirror and one clean ceramic tile were treated with the microparticulate silicone surface care composition Example 64 by applying a small amount of the material directly to the surface and wiping it into the surface with a paper towel using a firm circular motion until the surface was clear and sparkling.

B. Application of the Food Products to the Test Panels

2–4 gram samples of the following food products were poured or placed on the treated and untreated areas of glass mirror and ceramic tile test panels having about half of the area of the test panel as an untreated surface and the other half of the area treated with the microparticulate silicone surface care composition:

1. Spaghetti Sauce
2. Beef Gravy
3. Canola Cooking Oil
4. Potato Slice
5. Butter
6. Egg (white & yolk mix)
7. American Cheese
8. Milk
9. Chocolate Syrup C. Char Testing of Food Products on the Test Panels The test panels were placed in the center of the middle oven rack of an electric oven at room temperature. The thermostat was adjusted to 300° F. and the oven was turned on. After 30 minutes, the thermostat was raised to 400° F. After another 30 minutes, the thermostat was raised to 450° F. After another 30 minutes, the test panels were removed from the oven and allowed to cool to room temperature for evaluation.

D. Char Test Evaluations of Food Products on Heated Treated Test Panels

The heated panels were visually inspected to observe the adhesion of food to the panels. If charred food adhered to the surface a metal spatula was used to attempt to remove it easily or with pressure and scraping. If a residue remained, a paper towel (PT) was used to try to remove it. If the residue could not be removed with a paper towel, a soft sponge with a 1% dish washing detergent solution (DS) was used to attempt to remove the residue. If the soft sponge/detergent would not remove the residue, a "Teflon-Safe" scraping pad with a 1% dish washing detergent solution (TS/D) was used in an attempt to remove the residue.

The results of these observations are reported in Table K and Table L.

TABLE K

Charred Food Product
Test Results on Untreated and Treated Mirror Surfaces

| Food Product | Silicone Treated | Untreated |
| --- | --- | --- |
| Spaghetti Sauce | Char fell off when touched. PT removed residue. DS removed grease haze. | Char required removal with spatula. TS/D removed residue. |
| Beef Gravy | Char lifts off by itself. PT removes slight grease residue. | Char required removal with spatula. TS/D removed residue. |
| Canola Oil | Balled up liquid residue. PT wipes clean. DS removed grease haze. | Varnish-like brown residue difficult to remove with spatula. TS/D does not remove. |
| Potato Slice | Charred, falls off. PT removes residue. | Charred, sticks. Spatula removes. TS/D removes residue. |
| Butter | Oil with dark spots, no flow. PT removes. DS removes grease residue. | Oil flow dark spots. PT removes most. TS/D removes balance of residue. |
| Egg | Red char falls off. PT removes residue. DS wipes clean. | Spatula removes char. PT removes most. TS/D cleans. |
| American Cheese | Foam char falls off. PT wipes clean. | Spatula removes foam char. TS/D removes residue. |
| Milk | PT removed char. DS removes grease. | Char not removed with spatula or TS/D. |
| Chocolate Syrup | Char residue easily removed with spatula. PT removes heavy grease residue. DS wipes clean. | Spatula removed char. Clear crystal etch-like residue not removed with TS/D. |

TABLE L

Charred Food Product Test
Results on Untreated and Treated Tile Surfaces

| Food Product | Silicone Treated | Untreated |
|---|---|---|
| Spaghetti Sauce | Char removed easily with spatula. PT removes residue. DS removes grease. | Char required removal with spatula. TS/D removed residue. |
| Beef Gravy | Char loose. PT wipes residue clean. DS removes grease. | Spatula removes char. TS/D removes residue. |
| Canola Oil | Some flow. PT wipes clean. DS removes grease. | Varnish-like brown residue difficult to remove with spatula. TS/D does not remove. |
| Potato Slice | Charred, falls off. PT removes residue. | Charred, sticks. Spatula removes char. Residue not removed with TS/D. |
| Butter | Flows. Some dark spots. PT wipes clean. DS wipes clean. | Flows. Some dark spots. PT wipes off with difficulty. DS wipes clean. |
| Egg | Char loose. PT wipes residue clean. DS removes grease residue. | Char flakes off with spatula. TS/D cleans residue but leaves tile texture pattern. |
| American Cheese | Char loose. PT wipes clean. DS removes grease residue. | Char removed with spatula. PT does not wipe clean. SD removes residue. |
| Milk | Char loose. PT wipes clean. DS removes grease residue. | Char could not be removed with spatula or TS/D. |
| Chocolate Syrup | Char loose. PT wipes clean. DS removes grease residue. | Char removed with spatula. Dark residue not removed with TS/D. |

E. Conclusions of Char Testing

In all evaluations the mirror and ceramic tile panel areas coated with the microparticulate silicone surface care composition were far superior to the untreated mirror and ceramic tile panel areas in reducing or preventing the adhesion of charred food products to the surface and were far superior to the untreated panels with respect to the ease of clean-up of the surface after removal of the char.

In addition, both the mirror and ceramic tile panel areas treated with the microparticulate silicone surface care composition demonstrated no apparent loss of water and soil repellency after being exposed to the oven temperatures sufficient to char various foods thus demonstrating significant durability under those conditions.

Those of ordinary skill in the art realize that the descriptions, procedures, methods and compositions presented above can be revised or modified without deviating from the scope of the described embodiments, and such do not depart from the scope of the invention.

What is claimed is:

1. A non-corrosive and physiologically acceptable composition for rendering surfaces water and soil repellent consisting essentially of
   a solventless intimate mixture of a silicone, an acid and a particulate solid, wherein said components are contained in relative amounts to provide the water and soil repellent properties and the acid is essentially sequestered to render the composition non-corrosive and physiologically acceptable to epithelial tissue.

2. The composition of claim 1 which is physiologically acceptable and non-corrosive according to any one or more of the tests from the group consisting of the Code of Federal Regulations (16 CFR 1500), ASTM G31-72 (reapproved 1995), and Acid Availability Test.

3. The composition of claim 1 wherein said particulate solid is in an amount of from about 5 to about 90 percent by weight.

4. The composition of claim 1 wherein the particulate solid consists of particles having an average size of less than about 150 microns.

5. The composition of claim 4 wherein the particle size is on the order of about 1 to about 50 microns.

6. The composition of claim 1 wherein said particulate solid has a specific gravity on the order of about 0.12 to about 2.9 gms/cc.

7. The composition of claim 1 wherein the particulate solid consists of particles having a specific gravity on the order of about 0.12 to about 2.9 gms/cc and a particle size of less than about 150 microns.

8. The composition of claim 7 wherein the particle size is on the order of about 1 to about 50 microns.

9. The composition of claim 1 wherein the silicone is defined by the formula:

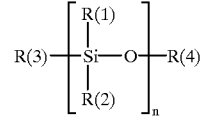

in which
   n is an integer from 1 to about 1000,
   R(1) and R(2) are independently lower alkyl, substituted alkyl, alkenyl, halogenated alkyl, alkoxy, or halogenated alkoxy radicals containing from 1 to 8 carbon atoms; aryl, halogenated aryl, phenoxy, alkylphenoxy, halogenated phenoxy or halogenated alkylphenoxy radicals containing about 6 to 14 carbon atoms; hydrogen, hydroxy, or halogen; and combinations thereof, and
   R(3) and R(4) are independently alkyl, substituted alkyl, alkenyl, halogenated alkyl, phenyl, alkylphenyl, substituted phenyl, hydroxyl, halogen, hydrogen or alkoxy, phenoxy, substituted alkoxy, substituted phenoxy, halogenated phenoxy, halogenated alkylphenoxy, and combinations thereof.

10. The composition of claim 1 wherein the silicone is a silicone liquid selected from the group consisting of polydialkylpolysiloxanes, polyalkylpolyalkoxypolysiloxanes, polyalkylhydrogensiloxanes, polyalkylarylpolysiloxanes, fluoro-substituted alkypolysiloxane, cyclic siloxanes, and combinations thereof, and copolymers thereof.

11. The composition of claim 1 wherein the silicone is an alkylpolysiloxane wherein the alkyl group contains from 1 to 8 carbon atoms.

12. The composition of claim 1 wherein the acid is selected from the group consisting of a mineral acid, an organic acid and salts thereof.

13. The composition of claim 1 wherein the acid is selected from the group consisting of sulfuric acid, sulfurous acid, hydrofluoric acid, hydrochloric acid, hydrobromic acid, phosphoric acid, phosphorous acid, pyrophosphoric acid, nitric acid, hydrogen sulfide, iodic acid, periodic acid, chromic acid, sulfamic acid, fluorosilicic acid, chlorosulfonic acid, fluorosulfonic acid, ammonium bifluoride, sodium bisulfate, mono- di- and trichloroacetic acid, mono- di- and trifluoroacetic acid, p-toluene sulfonic acid, benzene sulfonic acid, ethylsulfonic acid, methylsulfonic acid, ethylenedisulfonic acid, dodecylsulfonic acid, trifluoromethylsulfonic acid, perfluoroalkylcarboxylic acids, oleum, perfluoroalkylsulfonic acids, maleic acid, picric acid, trihydroxybenzoic acid, trinitrophenol and mixtures thereof.

14. The composition of claim 1 wherein the particulate solid is selected from the group consisting of mica, hydrocarbon waxes, polyethylene, polypropylene, polytetrafluoroethylene, phenolic resins, polyvinylchloride, crystalline graphite, amorphous graphite, carbon black, silicas, boron nitride, carnauba wax, glass microspheres, ceramic microspheres, perlite, vermiculite, talc and combinations thereof.

15. The composition of claim 14 wherein the particulate solids have a particle size of less than about 150 microns and a specific gravity of about 0.12 to about 2.9 gms/cc.

16. The composition of claim 1 wherein the silicone is in an amount of about 10 to about 85 percent by weight, the acid is in an amount of about 0.5 to about 20 percent by weight, and the particulate solid is in the amount of about 5 to about 90 percent by weight.

17. A physiologically acceptable composition in the form of a cream, paste or powder for rendering surfaces water and soil repellent consisting essentially of an intimate mixture of a silicone, an acid and a particulate solid to form a cream, paste or powder, wherein said components are contained in relative amounts to provide the water and soil repellent properties and the acid is essentially sequestered to render the composition physiologically acceptable to epithelial tissue.

18. The composition of claim 17 which is physiologically acceptable according to any one or more of the tests from the group consisting of the Code of Federal Regulations (16 CFR 1500) and Acid Availability Test.

19. The composition of claim 17 wherein said particulate solid is in an amount of from about 5 to about 90 percent by weight.

20. The composition of claim 17 wherein the particulate solid consists of particles having an average size of less than about 150 microns.

21. The composition of claim 17 wherein the particle size is on the order of about 1 to about 50 microns.

22. The composition of claim 17 wherein said particulate solid has a specific gravity on the order of about 0.12 to about 2.9 gms/cc.

23. The composition of claim 17 wherein the particulate solid consists of particles having a specific gravity on the order of about 0.12 to about 1.8 gms/cc and a particle size of less than about 150 microns.

24. The composition of claim 23 wherein the particle size is on the order of about 1 to about 50 microns.

25. The composition of claim 17 wherein the silicone is defined by the formula:

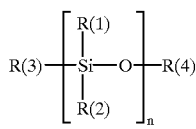

in which
n is an integer from 1 to about 1000,
R(1) and R(2) are independently lower alkyl, substituted alkyl, alkenyl, halogenated alkyl, alkoxy, or halogenated alkoxy radicals containing from 1 to 8 carbon atoms; aryl, halogenated aryl, phenoxy, alkylphenoxy, halogenated phenoxy or halogenated alkylphenoxy radicals containing about 6 to 14 carbon atoms; hydrogen, hydroxy, or halogen; and combinations thereof, and
R(3) and R(4) are independently alkyl, substituted alkyl, alkenyl, halogenated alkyl, phenyl, alkylphenyl, substituted phenyl, cyclosiloxyl, hydroxyl, halogen, hydrogen or alkoxy, phenoxy, substituted alkoxy, substituted phenoxy, halogenated phenoxy, halogenated alkylphenoxy, and combinations thereof.

26. The composition of claim 17 wherein the silicone is a silicone liquid selected from the group consisting of polydialkylpolysiloxanes, polyalkylpolyalkoxypolysiloxanes, polyalkylhydrogensiloxanes, polyalkylarylpolysiloxanes, fluoro-substituted alkypolysiloxane, cyclic siloxanes, and combinations thereof, and copolymers thereof.

27. The composition of claim 17 wherein the silicone is an alkylpolysiloxane wherein the alkyl group contains from 1 to 8 carbon atoms.

28. The composition of claim 17 wherein the acid is selected from the group consisting of a mineral acid, an organic acid and salts thereof.

29. The composition of claim 17 wherein the acid is selected from the group consisting of sulfuric acid, sulfurous acid, hydrofluoric acid, hydrochloric acid, hydrobromic acid, phosphoric acid, phosphorous acid, pyrophosphoric acid, nitric acid, hydrogen sulfide, iodic acid, periodic acid, chromic acid, sulfamic acid, fluorosilicic acid, chlorosulfonic acid, fluorosulfonic acid, ammonium bifluoride, sodium bisulfate, mono- di- and trichloroacetic acid, mono- di- and trifluoroacetic acid, p-toluene sulfonic acid, benzene sulfonic acid, ethylsulfonic acid, methylsulfonic acid, ethylenedisulfonic acid, dodecylsulfonic acid, trifluoromethylsulfonic acid, perfluoroalkylcarboxylic acids, oleum, perfluoroalkylsulfonic acids, maleic acid, picric acid, trihydroxybenzoic acid, trinitrophenol and mixtures thereof.

30. The composition of claim 17 wherein the particulate solid is selected from the group consisting of mica, hydrocarbon waxes, polyethylene, polypropylene, polytetrafluoroethylene, phenolic resins, polyvinylchloride, crystalline graphite, amorphous graphite, carbon black, silicas, boron nitride, carnauba wax, glass microspheres, ceramic microspheres, perlite, vermiculite, talc and combinations thereof.

31. The composition of claim 30 wherein the particulate solids have a particle size of less than about 150 microns and a specific gravity of about 0.12 to about 2.9 gms/cc.

32. The composition of claim 17 wherein the silicone is in an amount of about 10 to about 85 percent by weight, the acid is in an amount of about 0.5 to about 20 percent by weight, and the particulate solid is in the amount of about 5 to about 90 percent by weight.

33. A process of rendering a surface water and soil repellent comprising treating the surface with an intimate mixture of a silicone, an acid and a particulate solid, said mixture in the form of a solventless composition, a cream, a paste or a powder, wherein said components are contained in relative amounts to provide the water and soil repellent properties and the acid is essentially sequestered to render the composition physiologically acceptable to epithelial tissue, and forming a water repellent and soil repellent coating on said surface.

34. The process of claim 33 wherein the surface is selected from the group consisting of glass, porcelain, ceramic, marble, granite, metal, coated metal, plastic, wood, painted wood, cement, leather and cloth.

35. The process of claim 33 wherein said coating is a multi-molecular layer which hides or fills fine scratches and other defects in the surface and results in a restored appearance to the surface.

36. The process of claim 35 wherein the surface is selected from the group consisting of glass, porcelain, ceramic, metal, coated metal, and plastic.

37. The process of claim 36 wherein the surface is textured.

38. The process of claim 37 wherein the surface is glass.

39. The process of claim 33 which involves a one step application of the composition and wiping until clear without the formation of an intermediate haze.

40. The process of claim 33 wherein an optically clear multi-molecular layer of the silicone composition is provided on the surface.

41. The process of claim 33 wherein said particulate solid is in an amount of from about 5 to about 90 percent by weight.

42. The process of claim 33 wherein the particulate solid consists of particles having an average size of less than about 150 microns.

43. The process of claim 42 wherein the particle size is on the order of about 1 to about 50 microns.

44. The process of claim 33 wherein said particulate solid has a specific gravity on the order of about 0.12 to about 2.9 gms/cc.

45. The process of claim 33 wherein the particulate solid consists of particles having a specific gravity on the order of about 0.12 to about 1.8 gms/cc and a particle size of less than about 150 microns.

46. The process of claim 45 wherein the particle size is on the order of about 1 to about 50 microns.

47. The composition of claim 33 wherein the silicone is in an amount of about 10 to about 85 percent by weight, the acid is in an amount of about 0.5 to about 20 percent by weight, and the particulate solid is in the amount of about 5 to about 90 percent by weight.

48. The process of claim 33 wherein the silicone is defined by the formula:

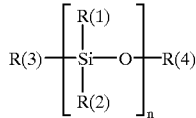

in which n is an integer from 1 to about 1000,

R(1) and R(2) are independently lower alkyl, substituted alkyl, alkenyl, halogenated alkyl, alkoxy, or halogenated alkoxy radicals containing from 1 to 8 carbon atoms; aryl, halogenated aryl, phenoxy, alkylphenoxy, halogenated phenoxy or halogenated alkylphenoxy radicals containing about 6 to 14 carbon atoms; hydrogen, hydroxy, or halogen; and combinations thereof, and R(3) and R(4) are independently alkyl, substituted alkyl, alkenyl, halogenated alkyl, phenyl, alkylphenyl, substituted phenyl, hydroxyl, halogen, hydrogen or alkoxy, phenoxy, substituted alkoxy, substituted phenoxy, halogenated phenoxy, halogenated alkylphenoxy, and combinations thereof.

49. The process of claim 33 wherein the silicone is a silicone liquid selected from the group consisting of polydialkylpolysiloxanes, polyalkylpolyalkoxypolysiloxanes, polyalkylhydrogensiloxanes, polyalkylarylpolysiloxanes, fluoro-substituted alkypolysiloxane, cyclic siloxanes, and combinations thereof, and copolymers thereof.

50. The process of claim 33 wherein the silicone is an alkylpolysiloxane wherein the alkyl group contains from 1 to 8 carbon atoms.

51. The process of claim 33 wherein the acid is selected from the group consisting of a mineral acid, an organic acid and salts thereof.

52. The process of claim 33 wherein the acid is selected from the group consisting of sulfuric acid, sulfurous acid, hydrofluoric acid, hydrochloric acid, hydrobromic acid, phosphoric acid, phosphorous acid, pyrophosphoric acid, nitric acid, hydrogen sulfide, iodic acid, periodic acid, chromic acid, sulfamic acid, fluorosilicic acid, chlorosulfonic acid, fluorosulfonic acid, ammonium bifluoride, sodium bisulfate, mono- di- and trichloroacetic acid, mono- di- and trifluoroacetic acid, p-toluene sulfonic acid, benzene sulfonic acid, ethylsulfonic acid, methylsulfonic acid, ethylenedisulfonic acid, dodecylsulfonic acid, trifluoromethylsulfonic acid, perfluoroalkylcarboxylic acids, oleum, perfluoroalkylsulfonic acids, maleic acid, picric acid, trihydroxybenzoic acid, trinitrophenol and mixtures thereof.

53. The process of claim 33 wherein the particulate solid is selected from the group consisting of mica, hydrocarbon waxes, polyethylene, polypropylene, polytetrafluoroethylene, phenolic resins, polyvinylchloride, crystalline graphite, amorphous graphite, carbon black, silicas, boron nitride, carnauba wax, glass microspheres, ceramic microspheres, perlite, vermiculite, talc and combinations thereof.

54. The process of claim 53 wherein the particulate solids have a particle size of less than about 100 microns and a specific gravity of about 0.12 to about 2.9 gms/cc.

55. A non-corrosive and physiologically acceptable composition free of volatile organic compounds (VOCs) for rendering surfaces water and soil repellent consisting essentially of an intimate mixture of a silicone liquid, an acid and a particulate solid, said mixture being essentially free of VOCs, wherein said components are contained in relative amounts to provide the water and soil repellent properties and the acid is essentially sequestered to render the composition non-corrosive and physiologically acceptable to epithelial tissue.

56. The composition of claim 55 which is physiologically acceptable and non-corrosive according to any one or more of the tests from the group consisting of the Code of Federal Regulations (16 CFR 1500), ASTM G31-72 (reapproved 1995), and Acid Availability Test.

57. The composition of claim 56 wherein the silicone is defined by the formula:

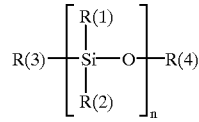

in which n is an integer from 1 to about 1000,

R(1) and R(2) are independently lower alkyl, substituted alkyl, alkenyl, halogenated alkyl, alkoxy, or halogenated alkoxy radicals containing from 1 to 8 carbon atoms; aryl, halogenated aryl, phenoxy, alkylphenoxy, halogenated phenoxy or halogenated alkylphenoxy radicals containing about 6 to 14 carbon atoms; hydrogen, hydroxy, or halogen; and combinations thereof, and R(3) and R(4) are independently alkyl, substituted alkyl, alkenyl, halogenated alkyl, phenyl, alkylphenyl, substituted phenyl, hydroxyl, halogen, hydrogen or alkoxy, phenoxy, substituted alkoxy, substituted phenoxy, halogenated phenyl, halogenated alkylphenoxy, and combinations thereof.

58. The composition of claim 56 wherein the silicone is an alkylpolysiloxane wherein the alkyl group contains from 1 to 8 carbon atoms.

59. The composition of claim 56 wherein the acid is selected from the group consisting of a mineral acid, an organic acid and salts thereof.

60. The composition of claim 56 wherein the acid is selected from the group consisting of sulfuric acid, sulfurous acid, hydrofluoric acid, hydrochloric acid, hydrobromic acid, phosphoric acid, phosphorous acid, pyrophosphoric acid, nitric acid, hydrogen sulfide, iodic acid, periodic acid, chromic acid, sulfamic acid, fluorosilicic acid, chlorosulfonic acid, fluorosulfonic acid, ammonium bifluoride, sodium bisulfate, mono- di- and trichloroacetic acid, mono- di- and trifluoroacetic acid, p-toluene sulfonic acid, benzene sulfonic acid, ethylsulfonic acid, methylsulfonic acid, ethylenedisulfonic acid, dodecylsulfonic acid, trifluoromethylsulfonic acid, perfluoroalkylcarboxylic acids, oleum, perfluoroalkylsulfonic acids, maleic acid, picric acid, trihydroxybenzoic acid, trinitrophenol and mixtures thereof.

61. The composition of claim 60 wherein the particulate solid is selected from the group consisting of mica, hydrocarbon waxes, polyeth ylene, polypropylene, polytetrafluoroethylene, phenolic resins, polyvinylchloride, crystalline graphite, amorphous graphite, carbon black, silicas, boron nitride, carnauba wax, glass microspheres, ceramic microspheres, perlite, vermiculite, talc and combinations thereof.

62. The composition of claim 61 wherein the particulate solids have a particle size of less than about 150 microns and a specific gravity of about 0.12 to about 2.9 gms/cc.

63. The composition of claim 55 wherein the silicone is in an amount of about 10 to about 85 percent by weight, the acid is in an amount of about 0.5 to about 20 percent by weight, and the particulate solid is in the amount of about 5 to about 90 percent by weight.

64. A method of making a storage stable physiologically acceptable composition in the form of a cream, paste or powder for rendering surfaces water and soil repellent comprising
intimately mixing a silicone, an acid and an particulate solid for a sufficient time and at a temperature in relative amounts to form a storage stable cream, paste or powder, wherein the acid is essentially sequestered to render the composition physiologically acceptable to epithelial tissue.

65. The method of claim 64 wherein said particulate solid is in an amount of from about 5 to about 90 percent by weight.

66. The method of claim 64 wherein the particulate solid consists of particles having an average size of less than about 150 microns.

67. The method of claim 66 wherein the particle size is on the order of about 1 to about 50 microns.

68. The method of claim 64 wherein said particulate solid has a specific gravity on the order of about 0.12 to about 2.9 gms/cc.

69. The method of claim 64 wherein the particulate solid consists of particles having a specific gravity on the order of about 0.12 to about 1.8 gms/cc and a particle size of less than about 150 microns.

70. The method of claim 69 wherein the particle size is on the order of about 1 to about 50 microns.

71. The method of claim 64 wherein the silicone is defined by the formula:

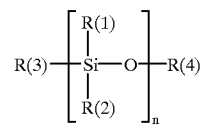

in which
n is an integer from 1 to about 1000,
R(1) and R(2) are independently lower alkyl, substituted alkyl, alkenyl, halogenated alkyl, alkoxy, or halogenated alkoxy radicals containing from 1 to 8 carbon atoms; aryl, halogenated aryl, phenoxy, alkylphenoxy, halogenated phenoxy or halogenated alkylphenoxy radicals containing about 6 to 14 carbon atoms; hydrogen, hydroxy, or halogen; and combinations thereof, and
R(3) and R(4) are independently alkyl, substituted alkyl, alkenyl, halogenated alkyl, phenyl, alkylphenyl, substituted phenyl, hydroxyl, halogen, hydrogen or alkoxy, phenoxy, substituted alkoxy, substituted phenoxy, halogenated phenoxy, halogenated alkylphenoxy, and combinations thereof.

72. The method of claim 64 wherein the silicone is a silicone liquid selected from the group consisting of polydialkylpolysiloxanes, polyalkylpolyalkoxypolysiloxanes, polyalkylhydrogensiloxanes, polyalkylarylpolysiloxanes, fluoro-substituted alkypolysiloxane, cyclic siloxanes, and combinations thereof, and copolymers thereof.

73. The method of claim 64 wherein the silicone is an alkylpolysiloxane wherein the alkyl group contains from 1 to 8 carbon atoms.

74. The method of claim 64 wherein the acid is selected from the group consisting of a mineral acid, an organic acid and salts thereof.

75. The method of claim 64 wherein the acid is selected from the group consisting of sulfuric acid, sulfurous acid, hydrofluoric acid, hydrochloric acid, hydrobromic acid, phosphoric acid, phosphorous acid, pyrophosphoric acid, nitric acid, hydrogen sulfide, iodic acid, periodic acid, chromic acid, sulfamic acid, fluorosilicic acid, chlorosulfonic acid, fluorosulfonic acid, ammonium bifluoride, sodium bisulfate, mono- di- and trichloroacetic acid, mono- di- and trifluoroacetic acid, p-toluene sulfonic acid, benzene sulfonic acid, ethylsulfonic acid, methylsulfonic acid, ethylenedisulfonic acid, dodecylsulfonic acid, trifluoromethylsulfonic acid, perfluoroalkylcarboxylic acids, oleum, perfluoroalkylsulfonic acids, maleic acid, picric acid, trihydroxybenzoic acid, trinitrophenol and mixtures thereof.

76. The method of claim 64 wherein the particulate solid is selected from the group consisting of mica, hydrocarbon waxes, polyethylene, polypropylene, polytetrafluoroethylene, phenolic resins, polyvinylchloride, crystalline graphite, amorphous graphite, carbon black, silicas, boron nitride, carnauba wax, glass microspheres, ceramic microspheres, perlite, vermiculite, talc and combinations thereof.

77. The method of claim 76 wherein the particulate solid have a particle size of less than about 150 microns and a specific gravity of about 0.12 to about 2.9 gms,cc.

* * * * *

UNITED STATES PATENT AND TRADEMARK OFFICE
CERTIFICATE OF CORRECTION

PATENT NO.     : 6,676,733 B2
DATED          : January 13, 2004
INVENTOR(S)    : Jerome H. Ludwig et al.

It is certified that error appears in the above-identified patent and that said Letters Patent is hereby corrected as shown below:

Column 16,
Line 56, (which begins "350 Cst."), under Example 20, insert -- 10 --

Column 17,
Line 6, Examples should be numbered 16, 17, 18, 19, 20

Column 28,
Line 55, change "TIME (mm)" to -- TIME (min) --

Column 29,
Line 20, change "TIME (mm)" to -- TIME (min) --

Column 39,
Line 30, change "composition of" to -- process of --

Column 41,
Line 29, change "polyeth ylene" to -- polyethylene --

Column 42,
Line 65, change "gms,cc" to -- gms/cc --

Signed and Sealed this

Seventh Day of September, 2004

JON W. DUDAS
*Director of the United States Patent and Trademark Office*